United States Patent
Kim et al.

(10) Patent No.: US 12,455,644 B2
(45) Date of Patent: Oct. 28, 2025

(54) TOUCH DISPLAY DEVICE

(71) Applicant: LG Display Co., Ltd., Seoul (KR)

(72) Inventors: Sangkyu Kim, Gyeonggi-do (KR); SeungRok Shin, Gyeonggi-do (KR); DeukSu Lee, Seoul (KR); Yoonnara Jang, Seoul (KR); Jeonghoon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/475,953

(22) Filed: Sep. 27, 2023

(65) Prior Publication Data

US 2024/0256061 A1    Aug. 1, 2024

(30) Foreign Application Priority Data

Jan. 27, 2023 (KR) .................. 10-2023-0011242

(51) Int. Cl.
*G06F 3/041* (2006.01)

(52) U.S. Cl.
CPC ........ *G06F 3/0412* (2013.01); *G06F 3/04164* (2019.05)

(58) Field of Classification Search
CPC ........................ G06F 3/0412; G06F 3/04164
See application file for complete search history.

(56) References Cited

U.S. PATENT DOCUMENTS

| | | | | |
|---|---|---|---|---|
| 2012/0026206 | A1* | 2/2012 | Moon | G09G 3/3614 257/59 |
| 2013/0100071 | A1* | 4/2013 | Wright | G06F 3/04166 345/173 |
| 2013/0215075 | A1 | 8/2013 | Lee et al. | |
| 2015/0116266 | A1 | 4/2015 | Inoue et al. | |
| 2015/0144920 | A1* | 5/2015 | Yamazaki | G06F 3/0447 |
| 2015/0160766 | A1* | 6/2015 | Park | G09G 3/3674 345/173 |
| 2017/0076683 | A1* | 3/2017 | Lee | G09G 3/3266 |
| 2017/0108970 | A1 | 4/2017 | Kim et al. | |
| 2017/0185198 | A1 | 6/2017 | Shepelev | |
| 2017/0228087 | A1* | 8/2017 | Liu | G06F 3/0443 |
| 2018/0033391 | A1 | 2/2018 | So et al. | |
| 2018/0188863 | A1 | 7/2018 | Yi et al. | |
| 2019/0204944 | A1 | 7/2019 | Jun et al. | |
| 2019/0265532 | A1* | 8/2019 | Yamazaki | G06F 3/0443 |
| 2019/0386001 | A1* | 12/2019 | Hong | G02F 1/136204 |
| 2020/0004367 | A1* | 1/2020 | Lee | G06F 3/03545 |
| 2020/0050339 | A1* | 2/2020 | Choi | G06F 3/0412 |

(Continued)

FOREIGN PATENT DOCUMENTS

| | | | |
|---|---|---|---|
| CN | 108780358 A | 11/2018 | |
| CN | 112599101 A | 4/2021 | |

(Continued)

*Primary Examiner* — William Boddie
*Assistant Examiner* — Bipin Gyawali
(74) *Attorney, Agent, or Firm* — Seed Intellectual Property Law Group LLP

(57) ABSTRACT

Embodiments of the disclosure may insert a break period when the gate line is not driven, such as a blank period, of an active period of a frame period and perform touch sensing, driven in the same manner as touch sensing driven in the blank period, in the break period, thereby reducing the influence of display driving on touch sensing and enhancing touch sensing performance.

20 Claims, 13 Drawing Sheets

(56) References Cited

U.S. PATENT DOCUMENTS

2022/0197475 A1    6/2022  Kim et al.
2025/0156009 A1*   5/2025  Lee ...................... G06F 3/0412

FOREIGN PATENT DOCUMENTS

| | | |
|---|---|---|
| JP | 2012159817 A | 8/2012 |
| JP | 2019121383 A | 7/2019 |
| TW | 201712657 A | 4/2017 |
| TW | I637298 B | 10/2018 |
| WO | WO 2015166687 A1 | 11/2015 |

* cited by examiner

TOUCH DISPLAY DEVICE

CROSS-REFERENCE TO RELATED APPLICATION

This application claims priority from Korean Patent Application No. 10-2023-0011242, filed on Jan. 27, 2023, which is hereby incorporated by reference for all purposes as if fully set forth herein.

BACKGROUND

Technical Field

Embodiments of the disclosure relate to touch display devices.

Description of Related Art

The display device may recognize a touch by the user's finger or pen on the display panel and provide a function of performing input processing based on the recognized touch.

For example, the display device may include a plurality of touch electrodes included in a display panel. The display device may drive a plurality of touch electrodes and detect a change in capacitance generated by the user's touch, thereby sensing whether there is a touch and touch coordinates. To this end, the display panel may include various electrodes and signal lines for driving the display in addition to the plurality of touch electrodes.

BRIEF SUMMARY

However, because the display panel includes various electrodes and signal lines for driving the display in addition to the plurality of touch electrodes, parasitic capacitance may be formed between the electrode for display driving and the touch electrode. Further, due to parasitic capacitance, the signal for display driving may act as noise to touch sensing, or the signal for touch sensing may act as noise to display driving.

One or more embodiments of the present disclosure address the various problems in the related art including the technical problem identified above.

Embodiments of the disclosure may provide a method capable of preventing degradation of display driving performance or touch sensing performance due to parasitic capacitance between electrodes for display driving and touch sensing electrodes.

Embodiments of the disclosure may provide a touch display device comprising a first gate driving circuit driving a first group of gate lines disposed on a display panel, a second gate driving circuit driving a second group of gate lines distinct from the first group, and a touch driving circuit driving a plurality of touch electrodes disposed on the display panel according to a first touch mode in a first period when the first group of gate lines are driven and a second period when the second group of gate lines are driven and driving the plurality of touch electrodes according to a second touch mode during a period of time between the first period and the second period.

Embodiments of the disclosure may provide a touch display device comprising a plurality of touch electrodes disposed on a display panel, a touch driving circuit driving some of the plurality of touch electrodes according to a first touch mode in a first period, driving others of the plurality of touch electrodes according to the first touch mode in a second period, and driving all of the plurality of touch electrodes according to a second touch mode in at least a partial period between the first period and the second period, and a gate driving circuit driving some of a plurality of gate lines disposed on the display panel in the first period, driving others of the plurality of gate lines in the second period, and refraining from driving the plurality of gate lines between the first period and the second period. Namely, there can be a third period between the first period and the second period. There may also be a fourth period after or before the first and second period. The third and fourth periods can be partial periods and do not need to be of same length of time as the first and second periods. During either the third and fourth periods, or both, touch electrodes can be driven according to the second touch mode.

Embodiments of the disclosure may provide a touch display device comprising a plurality of touch electrodes disposed on a display panel and a touch driving circuit driving the plurality of touch electrodes, wherein the touch driving circuit drives the plurality of touch electrodes according to a first touch mode in a first period and a second period of an active period of a frame period and drives the plurality of touch electrodes according to a second touch mode in a blank period of the frame period and a period between the first period and the second period.

According to embodiments of the disclosure, it is possible to prevent degradation of display driving or touch sensing performance due to parasitic capacitance between touch electrode and display driving electrode by adjusting a scheme in which display driving is performed according to a touch mode in which touch electrodes disposed on a display panel are driven.

DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
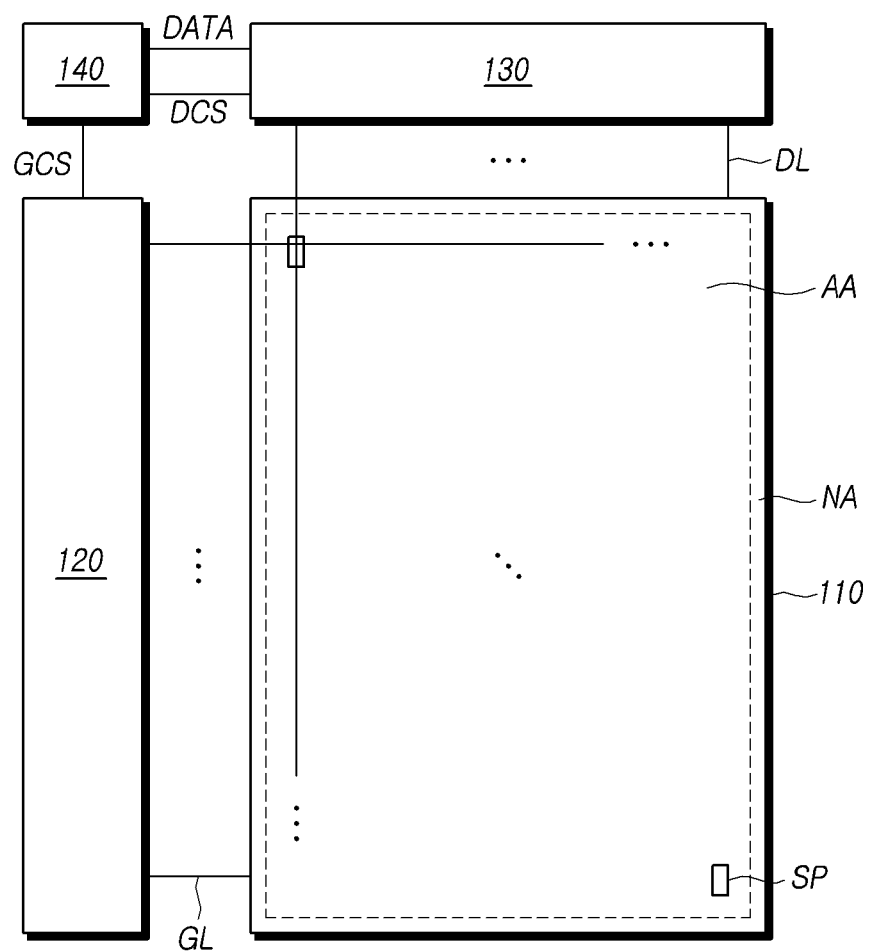
FIG. 1 is a view schematically illustrating a configuration of a touch display device according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Figure 2:
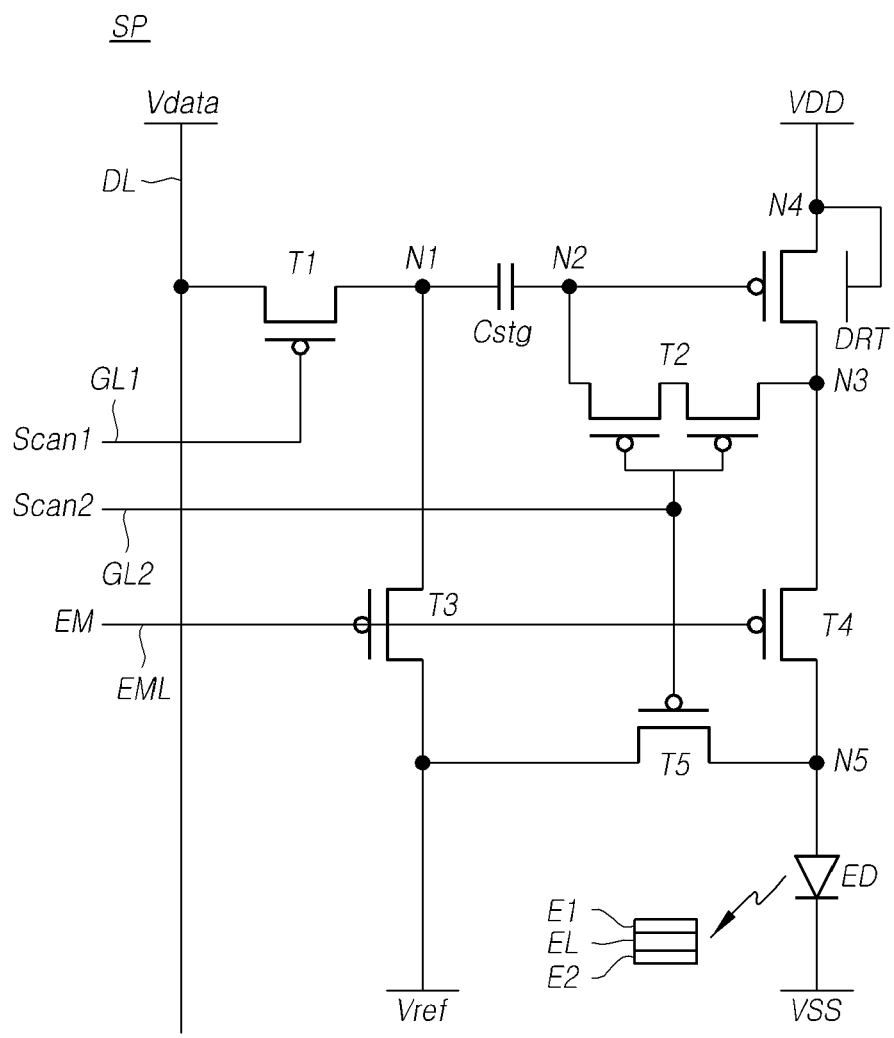
FIG. 2 is a view illustrating an example circuit structure of a subpixel included in a touch display device according to embodiments of the disclosure.

FIG. 1 is a view schematically illustrating a configuration of a touch display device 100 according to embodiments of the disclosure. FIG. 2 is a view illustrating an example circuit structure of a subpixel SP included in a touch display device 100 according to embodiments of the disclosure.

Referring to FIGS. 1 and 2, a touch display device 100 may include a display panel 110, a gate driving circuit 120 for driving the display panel 110, a data driving circuit 130, and a controller 140.

The touch display device 100 may further include a component for touch sensing in addition to a component for driving the display.

The display panel 110 may include an active area AA in which a plurality of subpixels SP are disposed and a non-active area NA positioned outside the active area AA. A plurality of gate lines GL and a plurality of data lines DL may be disposed on the display panel 110. The plurality of subpixels SP may be positioned in areas where the gate lines GL and the data lines DL overlap.

The gate driving circuit 120 may be controlled by the controller 140. The gate driving circuit 120 sequentially outputs scan signals to a plurality of gate lines GL disposed on the display panel 110 and may control driving timings of the plurality of subpixels SP.

The gate driving circuit 120 may include one or more gate driver integrated circuits (GDIC). The gate driving circuit 120 may be located only on one side of the display panel 110 or on each of two opposite sides according to driving methods.

Each gate driver integrated circuit GDIC may be connected to a bonding pad of the display panel 110 using a tape automated bonding (TAB) method or a chip on glass (COG) method. Alternatively, each gate driver integrated circuit GDIC may be implemented in a gate in panel (GIP) type and be disposed directly on the display panel 110. Alternatively, each gate driver integrated circuit GDIC may be integrated and disposed on the display panel 110. Each gate driver integrated circuit (GDIC) may also be implemented in a chip-on-film (COF) scheme to be mounted on a film connected to the display panel 110.

The data driving circuit 130 may receive image data DATA from the controller 140 and convert the image data DATA into an analog data voltage Vdata. The data driving circuit 130 may output the data voltage Vdata to each data line DL according to the timing of application of a scan signal through the gate line GL, so that each subpixel SP expresses a brightness according to the image data.

The data driving circuit 130 may include one or more source driver integrated circuits (SDICs). Each source driver integrated circuit (SDIC) may include, e.g., shift registers, latch circuits, digital-analog converters, and output buffers.

Each source driver integrated circuit SDIC may be connected to a bonding pad of the display panel 110 using a tape automated bonding (TAB) method or a chip on glass (COG) method. Alternatively, each source driver integrated circuit SDIC may be directly disposed on the display panel 110. Alternatively, each source driver integrated circuit SDIC may be integrated and disposed on the display panel 110. Alternatively, each source driver integrated circuit SDIC may be implemented by a chip on film (COF) method. In this case, each source driver integrated circuit SDIC may be mounted on a film connected to the display panel 110 and may be electrically connected to the display panel 110 through lines on the film.

The controller 140 may supply various control signals to the gate driving circuit 120 and the data driving circuit 130 and control the driving of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through a printed circuit board or a flexible printed circuit.

The controller 140 may control the gate driving circuit 120 to output a scan signal according to the timing set in each frame. The controller 140 may convert the image data received from the outside (e.g., a host system) according to a data signal format used by the data driving circuit 130 and output the converted image data DATA to the data driving circuit 130.

The controller 140 may receive, from the outside (e.g., host system), various timing signals including a vertical synchronization signal VSYNC, a horizontal synchronization signal HSYNC, an input data enable signal DE, and a clock signal CLK, together with the image data.

The controller 140 may generate a diversity of control signals using the timing signals received from the outside and output the control signals to the gate driving circuit 120 and the data driving circuit 130.

As an example, to control the gate driving circuit 120, the controller 140 may output various gate control signals GCS including a gate start pulse GSP, a gate shift clock GSC, and a gate output enable signal GOE.

The gate start pulse GSP may control the operation start timing of one or more gate driver integrated circuits GDICs constituting the gate driving circuit 120. The gate shift clock GSC is a clock signal commonly input to one or more gate driver integrated circuits GDICs and may control the shift timing of the scan signals. The gate output enable signal GOE may designate timing information about one or more gate driver integrated circuits GDICs.

To control the data driving circuit 130, the controller 140 may output various data control signals DCS including, e.g., a source start pulse SSP, a source sampling clock SSC, and a source output enable signal SOE, to the data driving circuit 130.

The source start pulse SSP may control the data sampling start timing of one or more source driver integrated circuits SDICs constituting the data driving circuit 130. The source sampling clock SSC may be a clock signal for controlling the sampling timing of data in each of one or more source driver integrated circuits SDIC. The source output enable signal SOE may control the output timing of the data driving circuit 130.

The touch display device 100 may further include a power management integrated circuit that supplies various voltages or currents to, or controls various voltages or currents to, the display panel 110, the gate driving circuit 120, the data driving circuit 130, and the like.

Each subpixel SP may be an area defined adjacent to a location where the gate line GL and the data line DL overlap each other, and may have a liquid crystal layer disposed thereon, or a light emitting element disposed thereon, depending on the type of touch display device 100.

For example, when the touch display device 100 is an organic light emitting display device, organic light emitting diodes (OLEDs) and various circuit elements may be disposed in the plurality of subpixels SP. Each subpixel SP may display a brightness corresponding to image data by controlling the current supplied to the OLED by several circuit elements.

Alternatively, in some cases, a light emitting diode (LED), a micro light emitting diode (µLED), or a quantum dot light emitting diode (QLED) may be disposed in the subpixel SP.

Referring to FIG. 2, each of the plurality of subpixels SP may include a light emitting element ED. The subpixel SP may include a driving transistor DRT that controls driving current supplied to the light emitting element ED.

The subpixel SP may include at least one circuit element in addition to the light emitting element ED and the driving transistor DRT to drive the subpixel SP.

For example, the subpixel SP may include a first transistor T1, a second transistor T2, a third transistor T3, a fourth transistor T4, a fifth transistor T5, and a storage capacitor Cstg.

The example shown in FIG. 2 illustrates a 6T1C structure in which 6 transistors and 1 capacitor are disposed, but embodiments of the disclosure are not limited thereto. Although the example shown in FIG. 2 illustrates a case where the transistors are P-type, at least some of the transistors disposed in the subpixel SP may be N-type.

Further, the transistor disposed in the subpixel SP may include, e.g., a semiconductor layer formed of low temperature polysilicon (LTPS) or a semiconductor layer formed of an oxide semiconductor. Further, in some cases, transistors including a semiconductor layer formed of low-temperature polycrystalline silicon and transistors including a semiconductor layer formed of an oxide semiconductor may be mixed and disposed in the subpixel SP.

The first transistor T1 may be electrically connected between the data line DL and the first node N1. The first transistor T1 may be controlled by the first scan signal Scan1 supplied through the first gate line GL1. The first transistor T1 may control application of the data voltage Vdata to the first node N1.

The second transistor T2 may be electrically connected between the second node N2 and the third node N3. The second node N2 may be the gate node of the driving transistor DRT. The third node N3 may be the drain node or source node of the driving transistor DRT. The second transistor T2 may be controlled by the second scan signal Scan2 supplied through the second gate line GL2. The second transistor T2 may perform an operation for compensating for a change in the threshold voltage of the driving transistor DRT.

The third transistor T3 may be electrically connected between the line to which the reference voltage Vref is supplied and the first node N1. The third transistor T3 may be controlled by the emission control signal EM supplied through the emission control line EML. The third transistor T3 may control discharge of the first node N1 or application of the reference voltage Vref to the first node N1.

The fourth transistor T4 may be electrically connected between the third node N3 and the fifth node N5. The fifth node N5 may be a node electrically connected to the light emitting element ED. The fourth transistor T4 may be controlled by the emission control signal EM supplied through the emission control line EML. The fourth transistor T4 may control the timing when driving current is supplied to the light emitting element ED.

The fifth transistor T5 may be electrically connected between a line to which the reference voltage Vref is supplied and the fifth node N5. The fifth transistor T5 may be controlled by the second scan signal Scan2 supplied through the second gate line GL2. The fifth transistor T5 may control discharge of the fifth node N5 or application of the reference voltage Vref to the fifth node N5.

The driving transistor DRT may be electrically connected between the fourth node N4 and the third node N3. The fourth node N4 may be electrically connected to a line to which the first driving voltage VDD is supplied. The first driving voltage VDD may be, e.g., a high-potential driving voltage. The fourth node N4 may be the source node or drain node of the driving transistor DRT.

The driving transistor DRT may be controlled by a voltage difference between the voltage of the second node N2 and the voltage of the fourth node N4. The driving transistor DRT may control the driving current supplied to the light emitting element ED.

The driving transistor DRT may include a back gate electrode electrically connected to the fourth node N4. The current output of the driving transistor DRT may be stably achieved by the back gate electrode electrically connected to the source node of the driving transistor DRT. For example, the back gate electrode may be disposed using a metal layer to block external light from entering the channel of the driving transistor DRT.

The light emitting element ED may be electrically connected between the fifth node N5 and the line to which the second driving voltage VSS is supplied. The second driving voltage VSS may be, e.g., a low-potential driving voltage.

The light emitting element ED may include a first electrode layer E1 electrically connected to the fifth node N5, a second electrode layer E2 to which the second driving voltage VSS is applied, and a light emitting layer EL disposed between the first electrode layer E1 and the second electrode layer E2.

The light emitting element ED may display a brightness according to the driving current supplied by the driving transistor DRT. The driving timing of the light emitting element ED may be controlled by the fourth transistor T4.

The driving timing of the subpixel SP shown in FIG. 2 is briefly described. A turn-on level second scan signal Scan2 may be supplied through the second gate line GL2. Since the transistor disposed in the subpixel SP is a P type, the turn-on level may be a low level.

The second transistor T2 and the fifth transistor T5 may be turned on by the turn-on level second scan signal Scan2.

Since the second transistor T2 is turned on, the second node N2 and the third node N3 may be electrically connected. A voltage obtained by reflecting the threshold voltage of the driving transistor DRT to the first driving voltage VDD may be applied to the second node N2 through the second transistor T2. Through this process, a change in the threshold voltage of the driving transistor DRT may be compensated for.

Since the fifth transistor T5 is turned on, the reference voltage Vref may be applied to the fifth node N5. The fifth node N5 may be initialized.

Thereafter, the turn-on level first scan signal Scan1 may be supplied through the first gate line GL1.

The first transistor T1 may be turned on by the turn-on level first scan signal Scan1.

Since the first transistor T1 is turned on, the data voltage Vdata may be applied to the first node N1.

The first driving voltage VDD, which reflects the data voltage Vdata and the threshold voltage of the driving transistor DRT may be applied to two opposite ends of the storage capacitor Cstg.

Thereafter, the turn-on level emission control signal EM may be supplied through the emission control line EML.

The third transistor T3 and the fourth transistor T4 may be turned on.

Since the third transistor T3 is turned on, the voltage of the first node N1 may be changed to the reference voltage Vref. The voltage of the second node N2 coupled to the first node N1 may be changed according to a change in voltage of the first node N1.

The voltage obtained by reflecting the threshold voltage of the driving transistor DRT and the data voltage Vdata to the first driving voltage VDD may be applied to the second node N2, and the first driving voltage VDD may be applied to the fourth node N4. The difference between the voltage of the second node N2 and the voltage of the fourth node N4 may be the voltage which reflects the data voltage Vdata and the threshold voltage of the driving transistor DRT. A driving current corresponding to the data voltage Vdata may be supplied by the driving transistor DRT.

Since the fourth transistor DRT is turned on, the driving current supplied by the driving transistor DRT may be supplied to the light emitting element ED.

The light emitting element ED may represent a brightness according to the driving current, and the subpixel SP including the light emitting element ED may display an image corresponding to image data.

Further, embodiments of the present disclosure may implement a touch sensor structure on the display panel 110 that displays images, providing the function for sensing the user's touch on the display panel 110.

Figure 3:
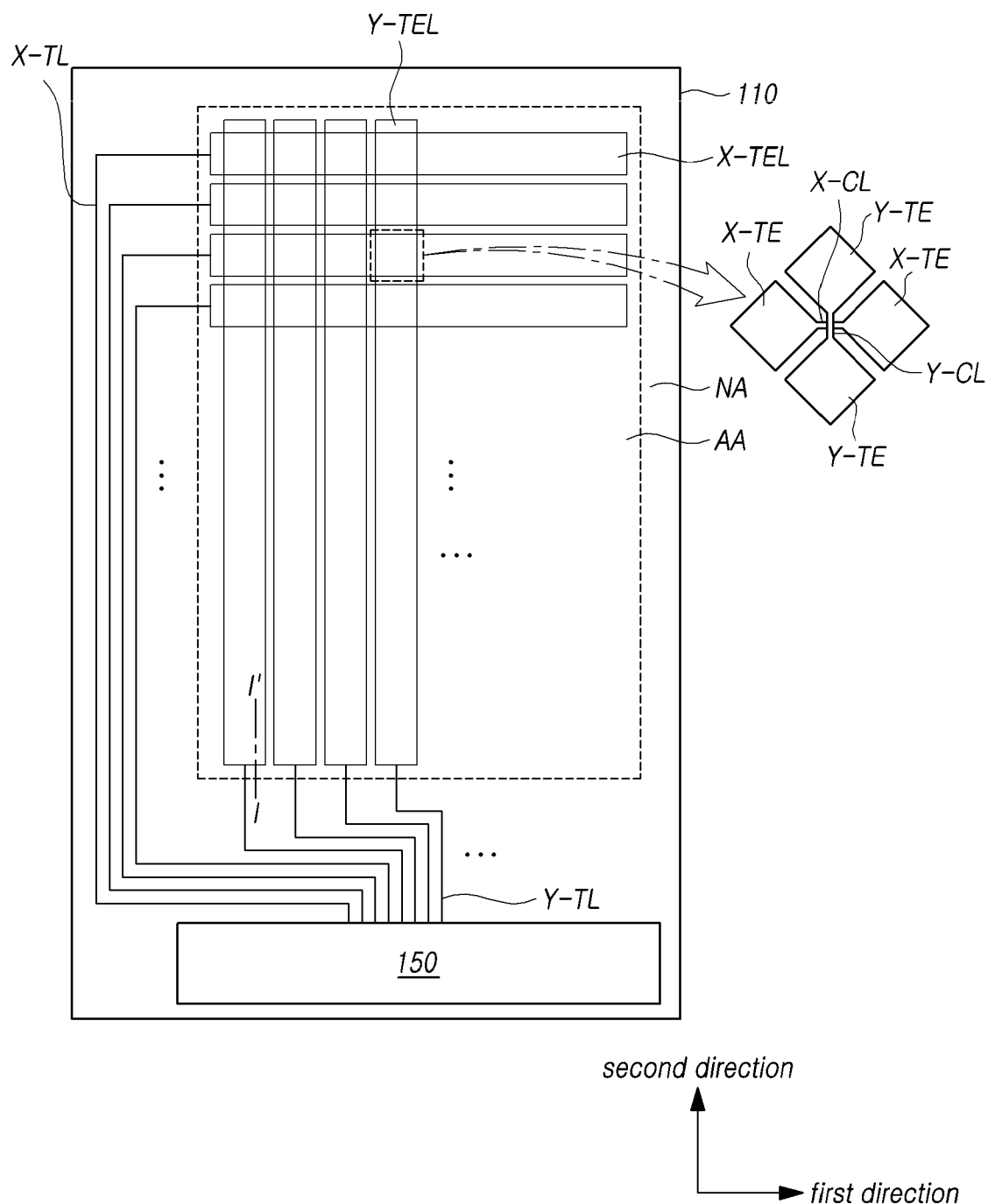
FIG. 3 is a view illustrating an example of a touch sensor structure included in a touch display device according to embodiments of the disclosure.
Figure 4:
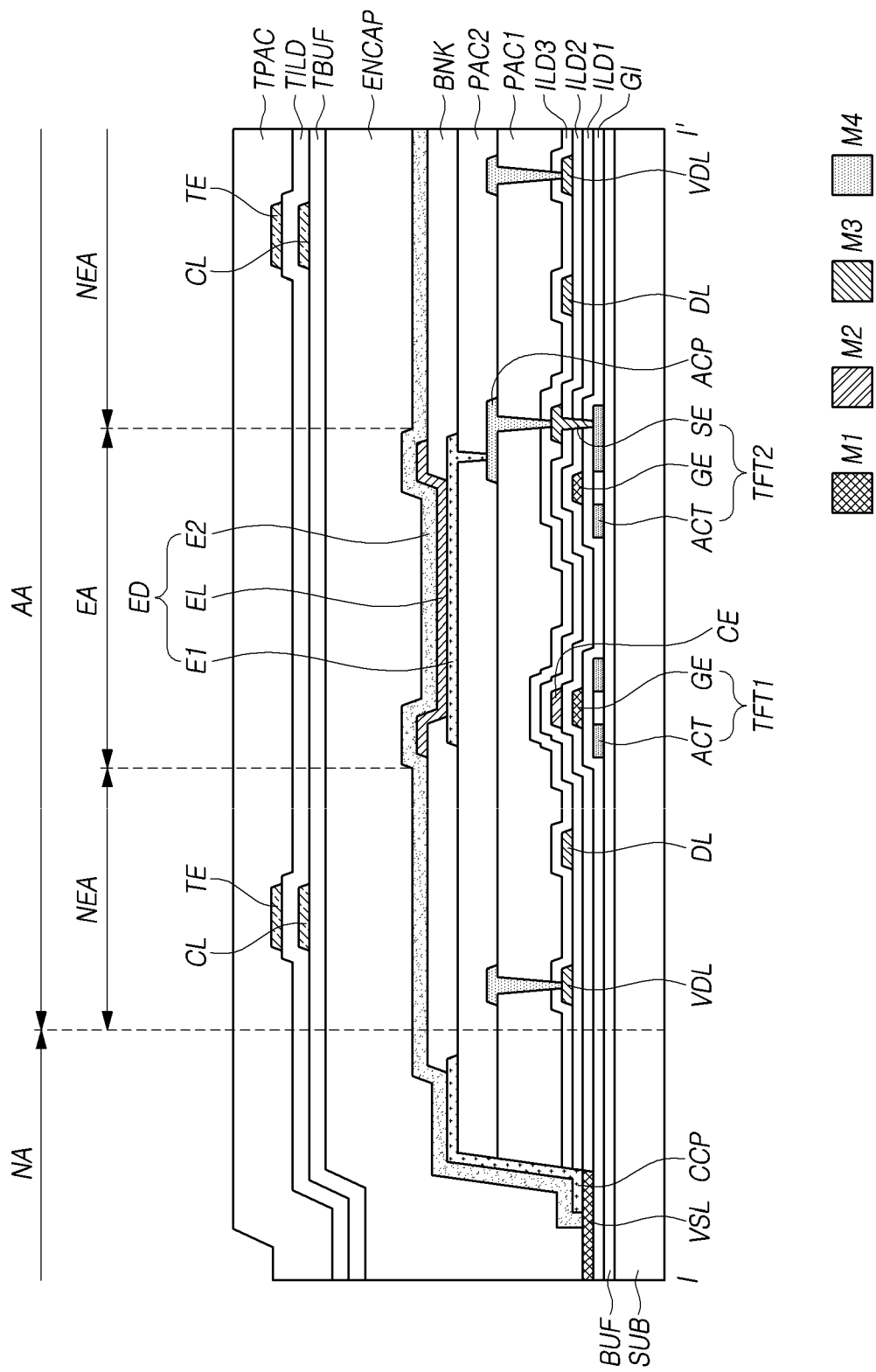
FIG. 4 is a cross-sectional view illustrating an example structure, taken along line I-I' of FIG. 3.

FIG. 3 is a view illustrating an example of a touch sensor structure included in a touch display device 100 according to embodiments of the disclosure. FIG. 4 is a cross-sectional view illustrating an example structure, taken along line I-I' of FIG. 3.

Referring to FIG. 3, the touch display device 100 may include a plurality of touch electrode lines TEL and a plurality of touch routing lines TL disposed on the display panel 110. The touch display device 100 may include a touch driving circuit 150 that drives the plurality of touch electrode lines TEL and the plurality of touch routing lines TL.

Each of the plurality of touch electrode lines TEL may be electrically connected to the touch driving circuit 150 through a touch routing line TL. The touch driving circuit 150 may be disposed separately or, in some cases, it may be integrated with a circuit for display driving. For example, the touch driving circuit 150 may be integrated with the data driving circuit 130.

Each of the plurality of touch electrode lines TEL may include a plurality of touch electrodes TE electrically connected to each other along one direction. Further, each of the plurality of touch electrode lines TEL may include a plurality of touch electrode connection patterns CL electrically connecting the plurality of touch electrodes TE to each other.

For example, each of the plurality of X-touch electrode lines X-TEL may include a plurality of X-touch electrodes X-TE arranged along a first direction and a plurality of X-touch electrode connection patterns X-CL electrically connecting the plurality of X-touch electrodes X-TE.

For example, each of the plurality of Y-touch electrode lines Y-TEL may include a plurality of Y-touch electrodes Y-TE arranged along a second direction crossing the first direction and a plurality of Y-touch electrode connection patterns Y-CL electrically connecting the plurality of Y-touch electrodes Y-TE.

The X-touch electrode line X-TEL and the Y-touch electrode line Y-TEL may be disposed on different layers. Alternatively, the X-touch electrodes X-TE and Y-touch electrodes Y-TE may be disposed on the same layer. In this case, either the X-touch electrode connection pattern X-CL or the Y-touch electrode connection pattern Y-CL may be disposed on a different layer from the touch electrode TE.

For example, the touch electrode TE may have a rectangular shape, but is not limited thereto.

The touch electrode TE may be formed of a transparent conductive material and may be positioned without interfering with the image display capabilities of the display panel 110.

Alternatively, the touch electrode TE may be formed of an opaque metal. In this case, the touch electrode TE may have an open area corresponding to the emission area of the light emitting element ED disposed on the display panel 110. For example, the touch electrode TE may be implemented in a mesh shape and disposed to avoid the emission area.

Referring to FIG. 4, the substrate SUB may include an active area AA in which a plurality of subpixels SP are disposed and a non-active area NA positioned outside the active area AA.

The active area AA may include an emission area EA in which light is emitted by the light emitting element ED and a non-emission area NEA that is an area other than the emission area EA.

A buffer layer BUF may be disposed on the substrate SUB.

A thin film transistor TFT may be disposed on the buffer layer BUF.

The thin film transistor TFT may include an active layer ACT and a gate electrode GE. The thin film transistor TFT may include a source electrode SE and a drain electrode (not shown).

The active layer ACT may be positioned on the buffer layer BUF. The active layer ACT may be formed of a semiconductor material. The active layer ACT may be formed of amorphous silicon or polycrystalline silicon.

A gate insulation layer GI may be disposed on the active layer ACT.

The gate electrode GE may be positioned on the gate insulation layer GI. The gate electrode GE may be disposed using the first metal layer M1.

Several signal lines may be disposed using the first metal layer M1.

For example, the second power line VSL supplying the second driving voltage VSS may be disposed using the first metal layer M1.

The second power line VSL may be positioned in the non-active area NA. In some cases, the second power line VSL may be positioned in the active area AA.

The second power line VSL may be electrically connected to the second electrode layer E2. A second electrode connection pattern CCP may be positioned in at least a partial area between the second power line VSL and the second electrode layer E2.

A first inter-layer insulation layer ILD1 may be disposed on the gate electrode GE.

A capacitor electrode CE may be positioned on the first inter-layer insulation layer ILD1. The capacitor electrode CE may be disposed using the second metal layer M2.

The capacitor electrode CE, together with the gate electrode GE of the first thin film transistor TFT1, may form a storage capacitor Cstg. The first thin film transistor TFT1 may be, e.g., the driving transistor DRT shown in FIG. 2.

A second inter-layer insulation layer ILD2 may be disposed on the capacitor electrode CE.

A source electrode SE may be positioned on the second inter-layer insulation layer ILD2. The source electrode SE may be electrically connected to the active layer ACT through a contact hole. The source electrode SE may be disposed using the third metal layer M3.

Several signal lines may be disposed using the third metal layer M3.

For example, the data line DL for supplying the data voltage Vdata may be disposed using the third metal layer M3. The first power line VDL for supplying the first driving voltage VDD may be disposed using the third metal layer M3.

A portion of the first power line VDL may be positioned in the active area AA. In some cases, the first power line VDL may be positioned in the non-active area NA.

The data line DL, the first power line VDL, and the second power line VSL may be disposed in various ways by using at least a portion of several metal layers.

FIG. 4 illustrates an example in which the data line DL and the first power line VDL are disposed using the third metal layer M3, but the data line DL and the first power line VDL may be disposed using the metal layer M1 or the second metal layer M2.

Further, as in the example shown in FIG. 4, the first power line VDL may include a portion formed of the third metal layer M3 and a portion formed of the fourth metal layer M4.

Accordingly, the resistance of the first power line VDL may be reduced.

A third inter-layer insulation layer ILD3 may be disposed on the third metal layer M3.

A first planarization layer PAC1 may be disposed on the third inter-layer insulation layer ILD3. The first planarization layer PAC1 may be formed of, e.g., an organic material.

A fourth metal layer M4 may be positioned on the first planarization layer PAC1.

A portion of the first power line VDL may be disposed using the fourth metal layer M4.

A first electrode connection pattern ACP may be disposed using the fourth metal layer M4. The second thin film transistor TFT2 and the light emitting element ED may be electrically connected by the first electrode connection pattern ACP. The second thin film transistor TFT2 may be, e.g., the fourth transistor T4 or the fifth transistor T5 shown in FIG. 2.

A second planarization layer PAC2 may be disposed on the fourth metal layer M4. The second planarization layer PAC2 may be formed of, e.g., an organic material.

A light emitting element ED may be disposed on the second planarization layer PAC2.

The first electrode layer E1 of the light emitting element ED may be positioned on the second planarization layer PAC2.

A bank layer BNK may be disposed on the second planarization layer PAC2 while exposing a portion of the first electrode layer E1.

A light emitting layer EL may be positioned on the first electrode layer E1. The light emitting layer EL may be positioned on a portion of the bank layer BNK.

A second electrode layer E2 may be positioned on the light emitting layer EL and the bank layer BNK.

An emission area EA may be determined by the bank layer BNK.

An encapsulation layer ENCAP may be disposed on the light emitting element ED. The encapsulation layer ENCAP may be formed of a single layer or multiple layers. For example, the encapsulation layer ENCAP may include a first inorganic layer, an organic layer, and a second inorganic layer.

A touch sensor structure may be disposed on the encapsulation layer ENCAP.

For example, the touch buffer layer TBUF may be positioned on the encapsulation layer ENCAP. The touch buffer layer TBUF may be formed of, e.g., an inorganic material. In some cases, the touch buffer layer TBUF may not be disposed. In this case, the electrode included in the touch sensor structure may be directly disposed on the encapsulation layer ENCAP.

A touch electrode connection pattern CL may be positioned on the touch buffer layer TBUF.

A touch insulation layer TILD may be positioned on the touch electrode connection pattern CL. The touch insulation layer TILD may be an organic material or an inorganic material. When the touch insulation layer TILD is an organic material, a layer formed of an inorganic material may be further disposed between the touch insulation layer TILD and the touch electrode connection pattern CL.

The touch electrode TE may be positioned on the touch insulation layer TILD.

A touch protection layer TPAC may be disposed on the touch electrode TE.

Since the touch electrode TE and the touch electrode connection pattern CL are disposed using a plurality of layers, it is possible to easily implement the touch sensor structure that include the X-touch electrode line X-TEL and the Y-touch electrode line Y-TEL.

The touch electrode TE and the touch electrode connection pattern CL may be disposed while avoiding the emission area EA. The touch electrode TE and the touch electrode connection pattern CL may overlap the non-emission area NEA.

Since the touch electrode TE and the touch electrode connection pattern CL are disposed on the encapsulation layer ENCAP while avoiding the emission area EA, the touch sensor structure may be included in the display panel 110 without affecting the image display function of the display panel 110.

Although not shown in FIG. 4, a touch routing line TL connected to the touch electrode TE may be disposed along an inclined surface of the encapsulation layer ENCAP. The touch routing line TL may be positioned on the same layer as the touch electrode TE and may be positioned on the same layer as the touch electrode connection pattern CL. Alternatively, the touch routing line TL may be disposed using the two layers. The touch routing line TL may be electrically connected to the pad positioned in the non-active area NA.

In a structure in which a plurality of X-touch electrode lines X-TEL and a plurality of Y-touch electrode lines Y-TEL are disposed to cross each other, the touch driving circuit 150 may perform touch sensing while driving the touch electrode line TEL through the touch routing line TL.

For example, either the X-touch electrode line X-TEL or the Y-touch electrode line Y-TEL may be a touch driving electrode to which a touch driving signal is applied. The other of the X-touch electrode line X-TEL and the Y-touch electrode line Y-TEL may be a touch sensing electrode from which a touch sensing signal is detected.

The touch driving circuit 150 may detect a change in mutual capacitance that occurs when the user touches in a state in which different signals are applied to the X-touch electrode line X-TEL and the Y-touch electrode line Y-TEL.

The touch driving circuit 150 may transfer sensing data according to the detected change in mutual capacitance to the touch controller. The touch controller may detect whether a touch to the display panel 110 has occurred and touch coordinates based on the sensing data received from the touch driving circuit 150.

The touch electrode lines TEL disposed on the display panel 110 may be divided and disposed in multiple areas in the active area AA.

Since the touch electrode line TEL is divided and disposed for each area, the load of the touch electrode line TEL may be reduced. When the area of the display panel 110 increases, it is possible to reduce the load of the touch electrode line TEL while enhancing touch sensing performance.

Further, the touch drive circuit 150 may recognize a touch by the user's finger as well as a touch by a touch input device by driving the X-touch electrode line X-TEL and the Y-touch electrode line Y-TEL. The text "a touch of a user" not only means touch using a user's finger but also includes any other part of a user's body that can establish a touch with the touch display device 100. For instance, while a user's finger is the most common and popular way to touch the display device, a user's knuckles can also be used to make a touch with the touch display device 100. The touch input device includes any type of input device that is capable of providing signals that can be sensed by the touch display device 100. Examples of a touch input device includes, but are not limited to, an electronic pen, digital pen, smart pen, active pen, stylus, or the like.

The manner and time for driving the touch electrode line TEL for the touch driving circuit 150 to recognize the touch by a touch input device, e.g., an electronic pen (hereinafter "pen") may differ from the manner and time for driving the touch electrode line TEL to recognize the touch by the user's finger.

Figure 5:
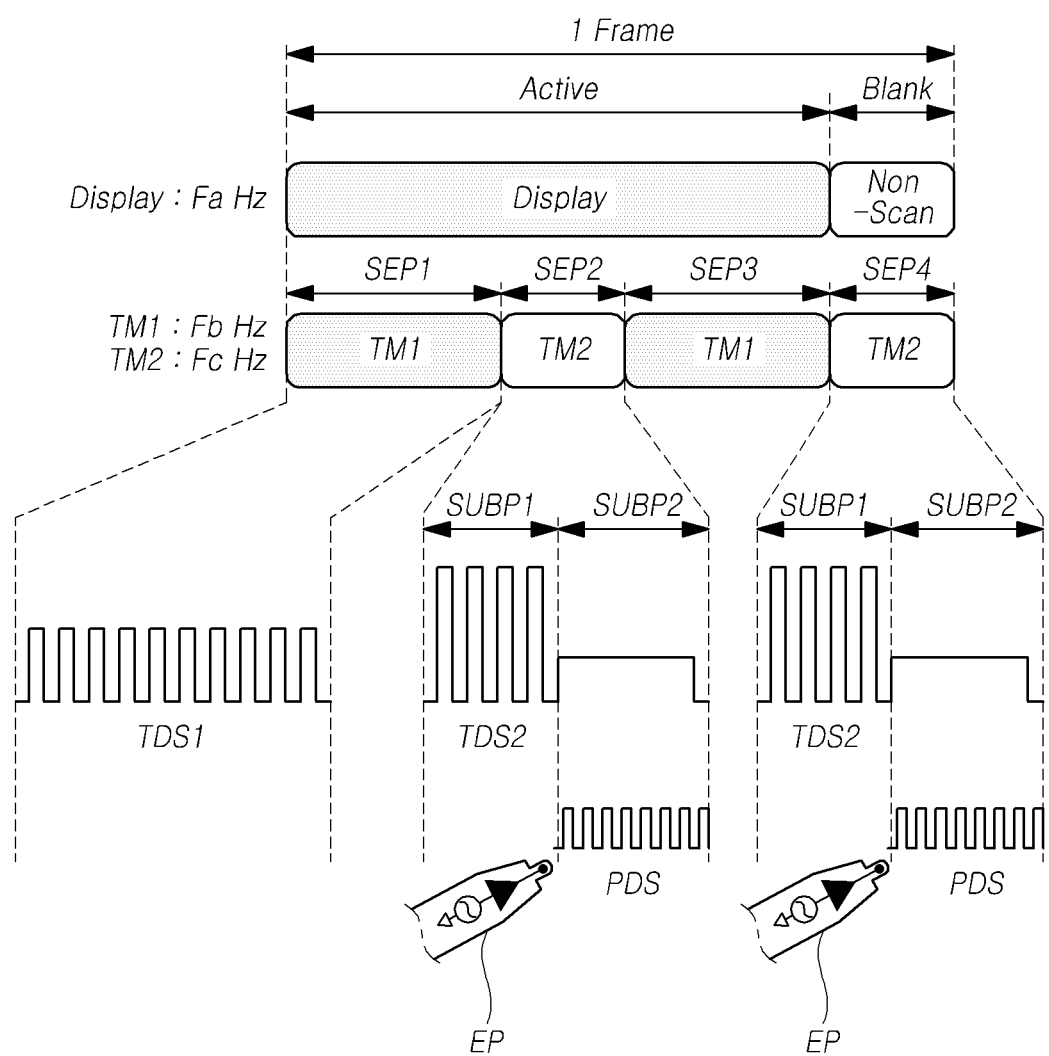
FIG. 5 is a view illustrating an example of a scheme for performing display driving and touch sensing in a touch display device according to embodiments of the disclosure.

FIG. 5 is a view illustrating an example of a scheme for performing display driving and touch sensing in a touch display device 100 according to embodiments of the disclosure. Described is an example in which touch sensing according to the manner shown in FIG. 5 is performed by the touch sensor structure shown in FIG. 3, but embodiments of the disclosure are not limited thereto.

Referring to FIG. 5, the touch display device 100 may perform touch sensing concurrently (or simultaneously) with display driving.

For example, one frame period may include an active period during which the scan signal is supplied to the gate line GL, and the data voltage Vdata for display driving is supplied and a blank period during which the gate line GL is not driven.

The touch display device 100 may perform driving for touch sensing in the active period and the blank period of the frame period. The touch display device 100 may perform touch sensing while driving the touch electrode line TEL in different manners according to the active period and the blank period.

For example, the touch driving circuit 150 of the touch display device 100 may perform touch sensing according to the first touch mode TM1 and touch sensing according to the second touch mode TM2 during one frame period. One frame period may include, e.g., a first touch sensing period SEP1, a second touch sensing period SEP2, a third touch sensing period SEP3, and a fourth touch sensing period SEP4.

In the illustrated embodiment, the first touch sensing period SEP1, the second touch sensing period SEP2, and the third touch sensing period SEP3 may correspond to the active period of the frame period.

The fourth touch sensing period SEP4 may correspond to the blank period of the frame period.

The touch driving circuit 150 may drive the touch electrode line TEL according to the first touch mode TM1 during the first touch sensing period SEP1 and the third touch sensing period SEP3. The first touch mode TM1 may be, e.g., a mode for sensing a touch of the user's finger on the display panel 110.

The touch driving circuit 150 may supply the first touch driving signal TDS1 to a touch driving electrode of the above-described X-touch electrode line X-TEL and Y-touch electrode line Y-TEL. The touch driving circuit 150 may supply a constant voltage to a touch sensing electrode of the above-described X-touch electrode line X-TEL and Y-touch electrode line Y-TEL and detect a change in capacitance due to the user's touch.

The touch driving circuit 150 may drive the touch electrode line TEL according to the second touch mode TM2 during the second touch sensing period SEP2 and the fourth touch sensing period SEP4. The second touch mode TM2 may be, e.g., a mode for sensing a touch by the user's pen EP on the display panel 110.

Each of the second touch sensing period SEP2 and the fourth touch sensing period SEP4 may include a first sub sensing period SUBP1 and a second sub sensing period SUBP2.

The touch driving circuit 150 may supply the second touch driving signal TDS2 to the touch electrode line TEL in the first sub sensing period SUBP1. For example, the touch driving circuit 150 may supply the second touch driving signal TDS2 to the X-touch electrode line X-TEL and the Y-touch electrode line Y-TEL in the first sub sensing period SUBP1.

The period when the second touch driving signal TDS2 is supplied to the X-touch electrode line X-TEL may be distinguished from the period when the second touch driving signal TDS2 is supplied to the Y-touch electrode line Y-TEL.

As the second touch driving signal TDS2 is supplied to the touch electrode line TEL, an uplink signal may be transmitted to a pen positioned outside the display panel 110. The uplink signal may include timing information for pen operation or various pieces of information.

Since the uplink signal is a signal transmitted to the pen positioned outside the display panel 110, the amplitude of the second touch driving signal TDS2 may be larger than the amplitude of the first touch driving signal TDS1, but is not limited thereto.

The touch driving circuit 150 may supply a positive voltage to the touch electrode line TEL in the second sub sensing period SUBP2. For example, the touch driving circuit 150 may concurrently (or simultaneously) supply a constant voltage to the X-touch electrode line X-TEL and the Y-touch electrode line Y-TEL in the second sub sensing period SUBP2.

The touch driving circuit 150 may receive a pen driving signal PDS transmitted by the pen in the second sub sensing period SUBP2. The touch driving circuit 150 may detect pen information or a touch by the pen based on the signal received in the second sub sensing period SUBP2.

As such, the touch driving circuit 150 may drive the touch electrode line TEL according to the first touch mode TM1 or the second touch mode TM2 in the sensing period temporally divided during the frame period and detect the touch by the user's finger or pen without causing signal interferences due to parasitic capacitance between electrodes for display driving and electrodes for touch sensing.

Further, the touch driving circuit 150 may drive the touch electrode line TEL according to various touch driving frequencies in the first touch mode TM1 and the second touch mode TM2.

For example, when the display driving frequency of the touch display device 100 is Fa Hz, the touch driving frequency according to the first touch mode TM1 may be Fb Hz, and the touch driving frequency according to the second touch mode TM2 may be Fc Hz.

The touch driving frequency Fb Hz according to the first touch mode TM1 may be the same as the display driving frequency Fa Hz. Since the touch driving frequency Fb Hz according to the first touch mode TM1 is equal to the display driving frequency Fa Hz, finger touch sensing by the touch driving circuit 150 may be performed once during one frame period.

The touch driving circuit 150 may perform touch sensing while driving only some of the touch electrode lines TEL in the first touch sensing period SEP1. The touch driving circuit 150 may perform touch sensing while driving the rest of the touch electrode lines TEL in the third touch sensing period SEP3.

Since some of the touch electrode lines TEL are driven during the first touch sensing period SEP1 and the third touch sensing period SEP3, interference between touch sensing and display driving may be reduced. Further, the touch driving circuit 150 may detect the touch sensing signal using a differential sensing scheme in the first touch mode TM1 and prevent noise from being generated in the touch sensing signal according to display driving.

The touch driving frequency Fc Hz according to the second touch mode TM2 may be different from the display driving frequency Fa Hz. For example, the touch driving frequency Fc Hz according to the second touch mode TM2 may be larger than the display driving frequency Fa Hz.

The touch driving circuit 150 may perform touch sensing while driving all of the touch electrode lines TEL in the second touch sensing period SEP2. The touch driving circuit 150 may perform touch sensing while driving all of the touch electrode lines TEL in the fourth touch sensing period SEP4.

Since touch sensing according to the second touch mode TM2 is performed once during the active period of the frame period and once during the blank period, touch sensing according to a touch driving frequency higher than the display driving frequency may be performed in one frame period, Alternatively, in some cases, the touch driving frequency Fb Hz according to the first touch mode TM1 may be different from the display driving frequency Fa Hz, and the touch driving frequency Fc Hz according to the second touch mode TM2 may be different from the display driving frequency Fa Hz. Alternatively, in some cases, the touch driving frequency Fc Hz according to the second touch mode TM2 may be smaller than the display driving frequency Fa Hz or the touch driving frequency Fb Hz according to the first touch mode TM1.

Further, embodiments of the disclosure may further reduce interference between display driving and touch sensing by adjusting the scheme in which display driving is performed in the period corresponding to the touch sensing period according to each touch mode.

Figure 6:
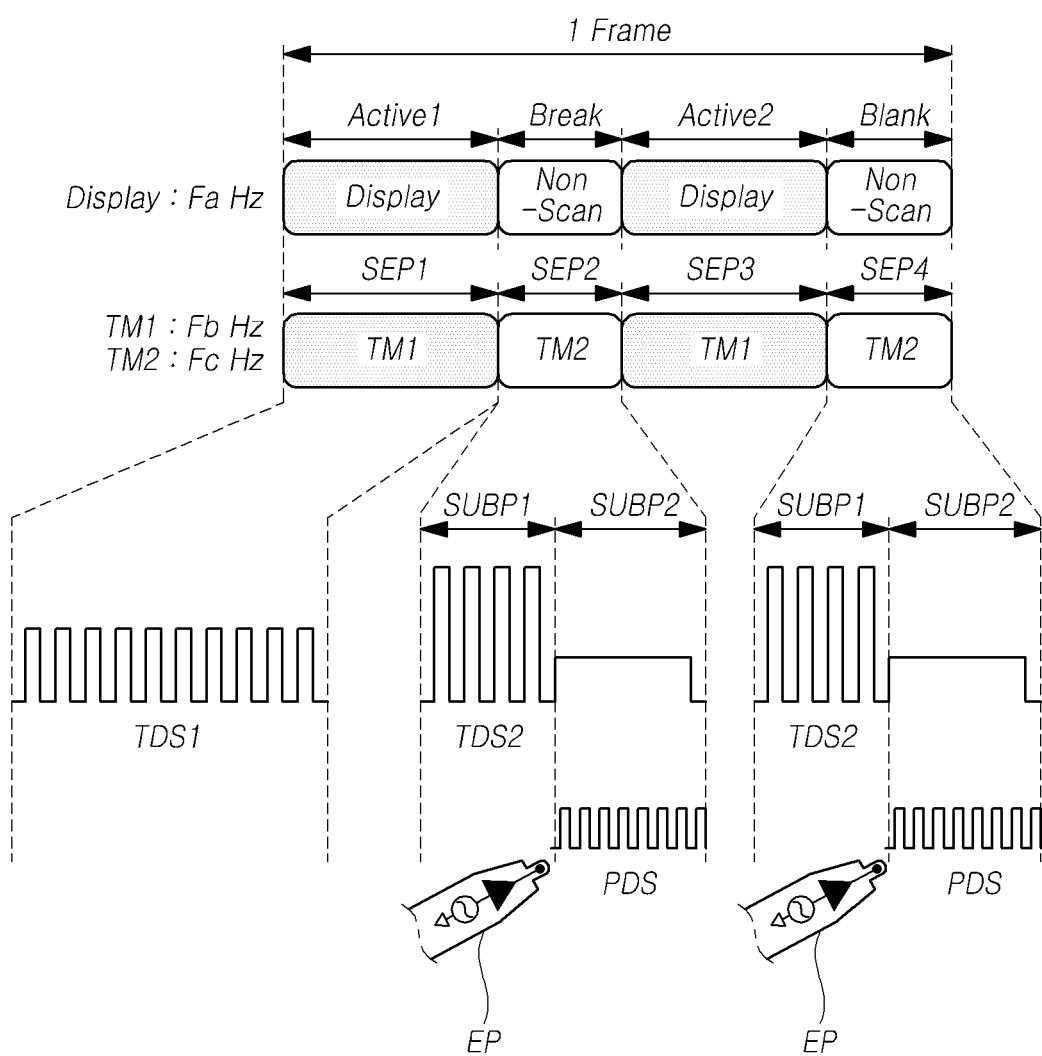
FIG. 6 is a view illustrating another example of a scheme for performing display driving and touch sensing in a touch display device according to embodiments of the disclosure.

FIG. 6 is a view illustrating another example of a scheme for performing display driving and touch sensing in a touch display device 100 according to embodiments of the disclosure.

Referring to FIG. 6, the touch display device 100 may perform display driving according to the display driving frequency Fa Hz.

The touch display device 100 may perform touch sensing concurrently (or simultaneously) with display driving. For example, the touch display device 100 may perform touch sensing according to the first touch mode TM1 according to the touch driving frequency Fb Hz. The touch display device 100 may perform touch sensing according to the second touch mode TM2 according to the touch driving frequency Fc Hz.

One frame period may include a first touch sensing period SEP1, a second touch sensing period SEP2, a third touch sensing period SEP3, and a fourth touch sensing period SEP4.

The touch driving circuit 150 may perform touch sensing according to the first touch mode TM1 during the first touch sensing period SEP1 and the third touch sensing period SEP3. The touch driving circuit 150 may perform touch sensing according to the second touch mode TM2 during the second touch sensing period SEP2 and the fourth touch sensing period SEP4.

An example in which the touch driving frequency Fc Hz according to the second touch mode TM2 is larger than the touch driving frequency Fb Hz according to the first touch mode TM1 is described as an example.

In terms of display driving, one frame period may include a first active period, a break period, a second active period, and a blank period.

The first active period and the second active period may correspond to the first touch sensing period SEP1 and the third touch sensing period SEP3, respectively.

The break period may be a period between the first active period and the second active period. The break period may correspond to the second touch sensing period SEP2.

The blank period may correspond to the fourth touch sensing period SEP4. When viewed contiguously with the next frame, the blank period may be regarded as a period between the second active period of the current frame and the first active period of the next frame.

The length of the break period may be equal to the length of the blank period. Or, the length of the break period may be different from the length of the blank period, but may be set longer than the length of the second touch sensing period SEP2.

In FIG. 6, the periods Active1 and Active2 can each be considered a first active period and a second active period, respectively, as can periods SEP1 and SEP3. The break period and the blank period can be considered third and fourth periods, respectively, as can periods SEP2 and SEP4. Each of the first to fourth periods do not need to be the same length as each other and the third and fourth periods can be shorter than the first and second periods; they can also be referred to as partial periods.

A scan signal may be supplied to the gate line GL disposed on the display panel 110 during the first active period and the second active period, and display driving may be performed. For example, during the first active period, some of the plurality of gate lines GL disposed on the display panel 110 may be driven. During the second active period, the rest of the plurality of gate lines GL disposed on the display panel 110 may be driven.

During the break period and the blank period, the gate lines GL disposed on the display panel 110 may not be driven.

Each of the second touch sensing period SEP2 and the fourth touch sensing period SEP4 when touch sensing is performed according to the second touch mode TM2 may respectively correspond to the break period and the blank period when the gate line GL is not driven.

During the period when touch sensing according to the second touch mode TM2 is performed, the gate line GL is not driven, and the data voltage Vdata may not be supplied to the subpixel SP.

During touch sensing according to the second touch mode TM2, noise caused by display driving may be prevented from affecting touch sensing. Further, since the period during which the second touch driving signal TDS2 having a larger amplitude is applied corresponds to the break period and the blank period, the driving according to the second touch mode TM2 may prevented from affecting the display driving.

A connection structure of the gate lines GL disposed on the display panel 110 and a gate driving circuit 120 that drive the gate lines GL may be provided so that display driving may be performed separately in the first active period and the second active period.

Figure 7A:
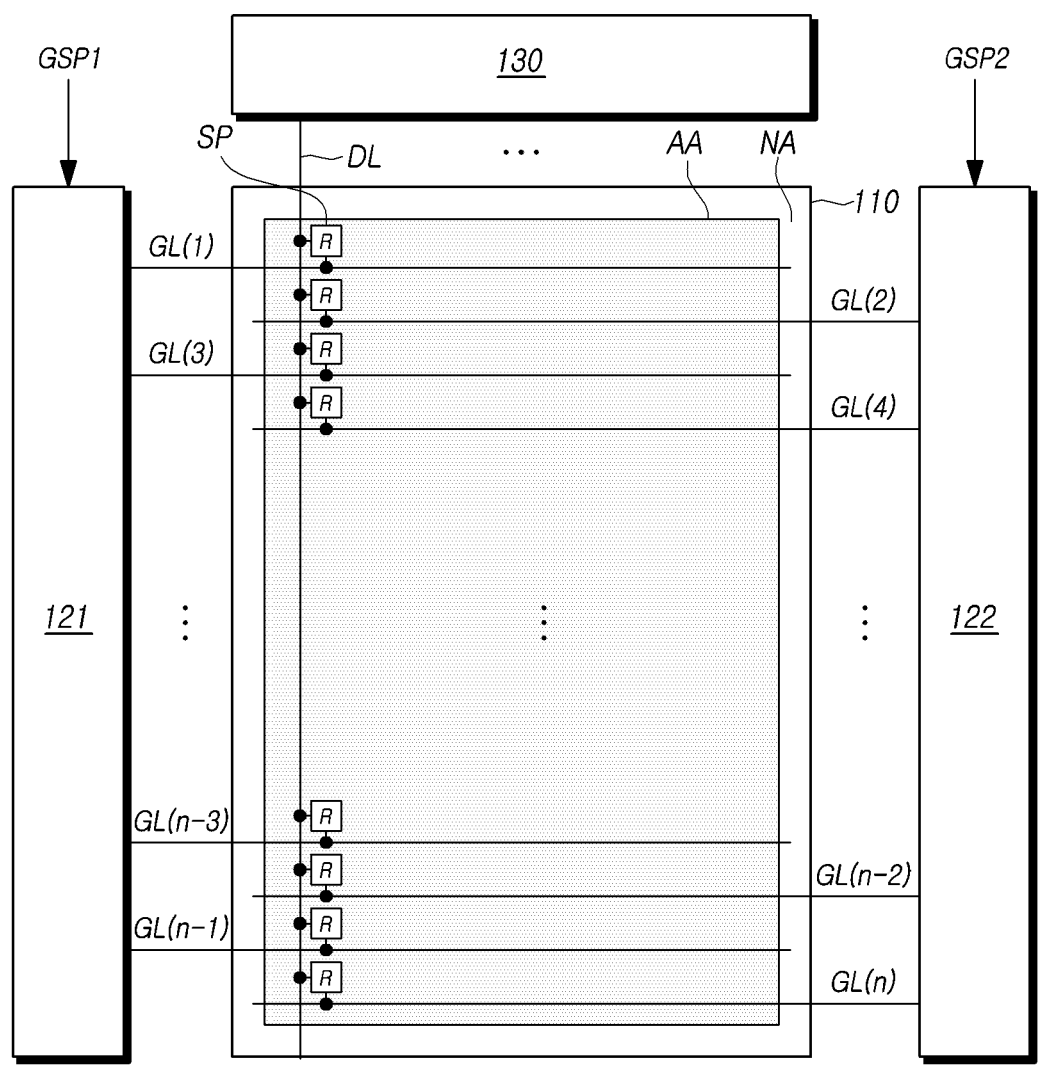
FIG. 7A is a view illustrating an example of a structure in which a driving circuit for display driving and signal lines are disposed in a touch display device according to embodiments of the disclosure.
Figure 7B:
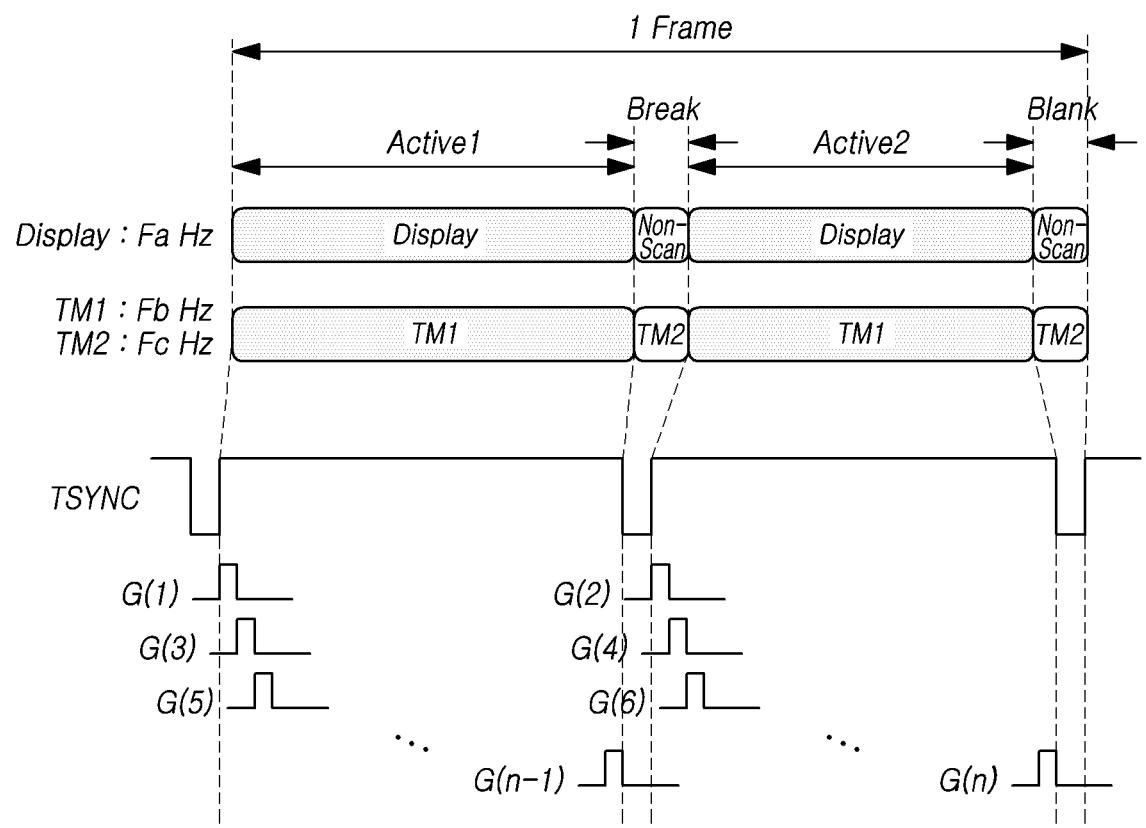
FIG. 7B is a view illustrating an example of a scheme for performing display driving and touch sensing in a touch display device as shown in FIG. 7A.

FIG. 7A is a view illustrating an example of a structure in which a driving circuit for display driving and signal lines are disposed in a touch display device 100 according to embodiments of the disclosure. FIG. 7B is a view illustrating an example of a scheme for performing display driving and touch sensing in a touch display device 100 as shown in FIG. 7A.

Referring to FIG. 7A, a gate driving circuit 120 may include a first gate driving circuit 121 and a second gate driving circuit 122.

The first gate driving circuit 121 may drive some of the plurality of gate lines GL disposed on the display panel 110. The second gate driving circuit 122 may drive the rest of the plurality of gate lines GL disposed on the display panel 110.

Among the plurality of gate lines GL, the gate lines GL driven by the first gate driving circuit 121 may be referred to as a first group of gate lines GL. Among the plurality of gate lines GL, the gate lines GL driven by the second gate driving circuit 122 may be referred to as a second group of gate lines GL.

For example, when n gate lines GLs are disposed on the display panel 110, the first gate driving circuit 121 may drive odd-numbered first gate lines GL(1), GL(3), . . . , GL(n−3), and GL(n−1) among the n gate lines GLs. The second gate driving circuit 122 may drive the even-numbered first gate lines GL(2), GL(4), . . . , GL(n−2), and GL(n) of the n gate lines GL.

In some cases, the first gate driving circuit 121 may drive the gate lines GL on the upper side of the display panel 110, and the second gate driving circuit 122 may drive the gate lines GL on the lower side of the display panel 110.

The first gate driving circuit 121 and the second gate driving circuit 122 may operate in distinct periods and drive the gate lines GL. Further, the first gate driving circuit 121 and the second gate driving circuit 122 may operate according to separate gate start pulses GSP.

For example, the first gate driving circuit 121 may receive a first gate start pulse GSP1 and operate according to the first gate start pulse GSP1. The second gate driving circuit 122 may receive a second gate start pulse GSP2 input in a different period from the first gate start pulse GSP1 and operate according to the second gate start pulse GSP2.

The period during which the gate lines GL are driven by the first gate driving circuit 121 and the second gate driving circuit 122 may be adjusted by the first gate start pulse GSP1 and the second gate start pulse GSP2.

The period when the first gate driving circuit 121 and the second gate driving circuit 122 drive the gate lines GL may correspond to the first active period and the second active period of the frame period.

For example, referring to FIG. 7B, the first gate driving circuit 121 may drive the first group of gate lines GL in the first active period of the frame period.

The first gate driving circuit 121 may receive a first gate start pulse GSP1 in accordance with the first active period. Upon receiving the first gate start pulse GSP1, the first gate driving circuit 121 may sequentially output scan signals G(1), G(3), G(5), . . . , G(n−1) to drive the first group of gate lines GL.

During the first active period, the data voltage Vdata may be supplied to the subpixels SP driven by the first group of gate lines GL to perform display driving.

Touch sensing according to the first touch mode TM1 may be performed in the period when the first group of gate lines GL are driven by the first gate driving circuit 121.

The second gate driving circuit 122 may receive a second gate start pulse GSP2 in accordance with the second active period. Upon receiving the second gate start pulse GSP2, the second gate driving circuit 122 may sequentially output scan signals G(2), G(2), G(2), . . . , G(n−2) to drive the second group of gate lines GL.

During the second active period, the data voltage Vdata may be supplied to the subpixels SP driven by the second group of gate lines GL to perform display driving.

Touch sensing according to the first touch mode TM1 may be performed in the period when the second group of gate lines GL are driven by the second gate driving circuit 122.

An interval may be present between when the last gate line GL of the first group of gate lines GL is driven and when the first gate line GL of the second group of gate lines GL is driven.

An interval may be present between when the scan signal G(n−1) is supplied to the (n−1)th gate line GL(n−1) of the first group of gate lines GL and when the second gate start pulse GSP2 is supplied to the second gate driving circuit 122. There may be an interval between the output of scan signal G(n−1) and the output of scan signal G(2).

The period between when the scan signal G(n−1) is output and when the scan signal G(2) is output may be a break period. Touch sensing according to the second touch mode TM2 may be performed in the period corresponding to the break period.

Since the first gate driving circuit 121 and the second gate driving circuit 122 drive distinct gate lines GL and operate according to separate gate start pulses GSPs, a break period may be present between the first active period and the second active period. Since touch sensing according to the second touch mode TM2 is performed in the period corresponding to the break period, display driving may be prevented from affecting touch sensing according to the second touch mode TM2.

Further, when viewed in successive frames, there may be an interval between when the scan signal G(n) is supplied to the last gate line GL of the second group of gate lines GL and when the scan signal G(1) is supplied to the first gate line GL of the first group of gate lines GL.

The interval between when the scan signal G(n) is supplied and when the scan signal G(1) is supplied may be a blank period, which may be the same as the break period. Similarly, since touch sensing according to the second touch mode TM2 is performed between when the scan signal G(n) is supplied and when the scan signal G(1) is supplied, display driving may be prevented from affecting touch sensing according to the second touch mode TM2.

Further, according to embodiments of the disclosure, each of the first gate driving circuit 121 and the second gate driving circuit 122 may concurrently (or simultaneously) drive two or more gate lines GL.

Thus, when one frame period includes a break period and display driving is performed with the frame period divided into a first active period and a second active period, it is possible to secure a sufficient time to supply the data voltage Vdata to the subpixels SP.

Figure 8A:
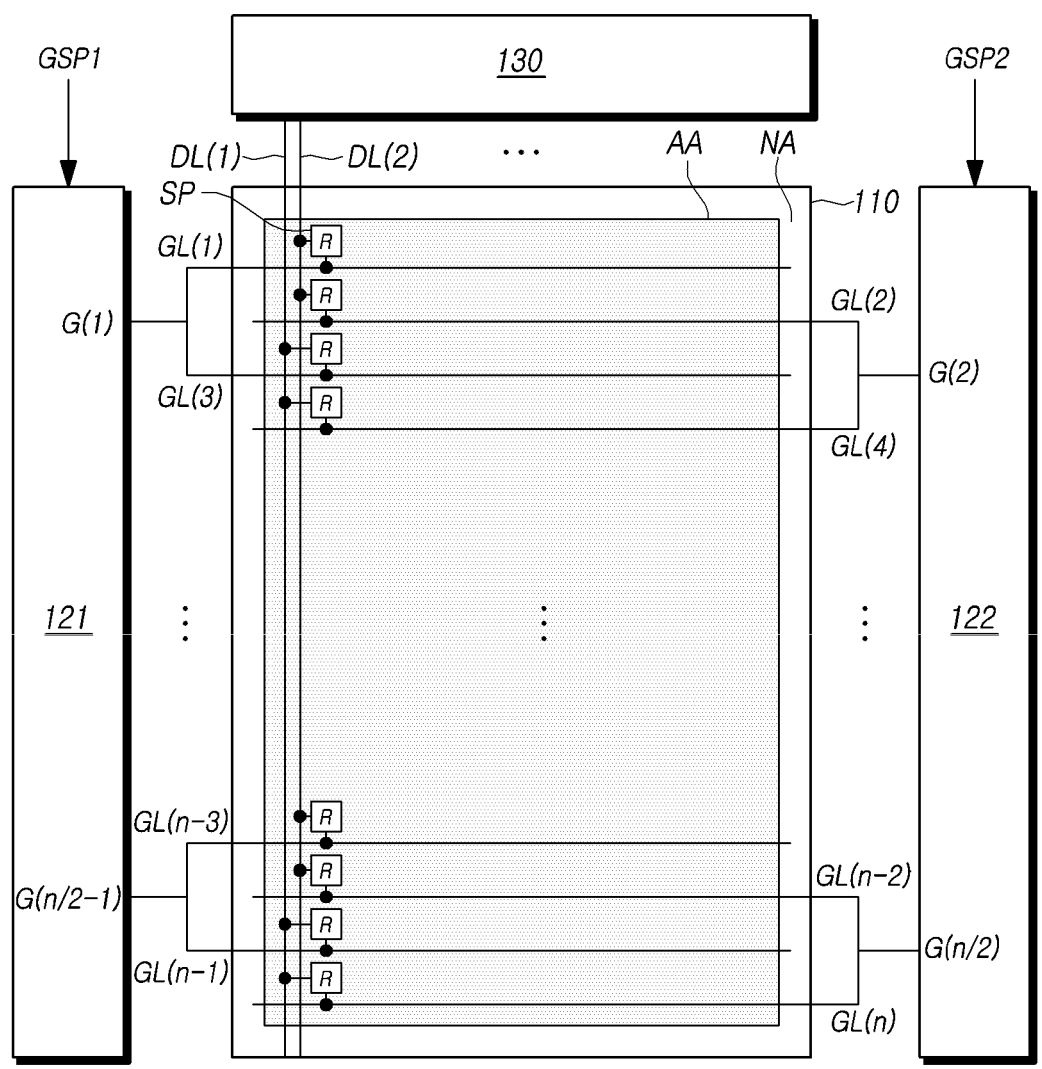
FIG. 8A is a view illustrating another example of a structure in which a driving circuit for display driving and signal lines are disposed in a touch display device according to embodiments of the disclosure.
Figure 8B:
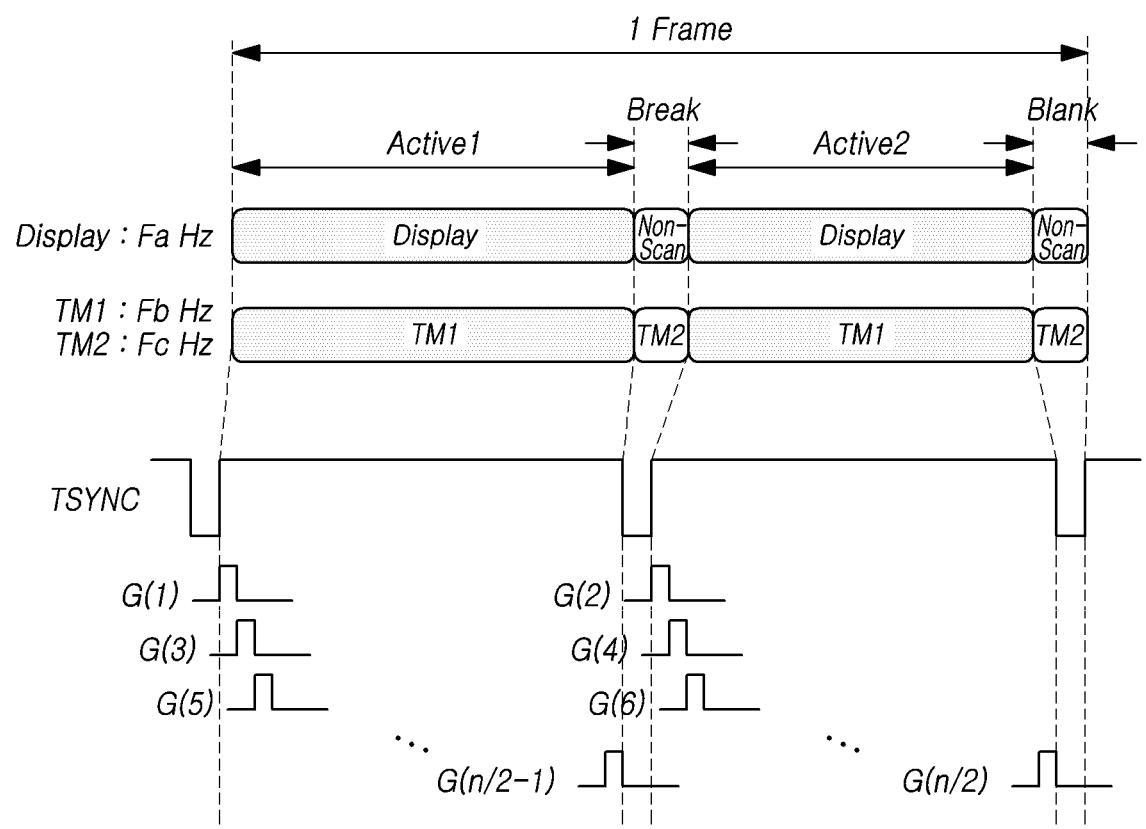
FIG. 8B is a view illustrating an example of a scheme for performing display driving and touch sensing in a touch display device as shown in FIG. 8A.

FIG. 8A is a view illustrating another example of a structure in which a driving circuit for display driving and signal lines are disposed in a touch display device 100 according to embodiments of the disclosure. FIG. 8B is a view illustrating an example of a scheme for performing display driving and touch sensing in a touch display device 100 as shown in FIG. 8A.

Referring to FIGS. 8A and 8B, the n gate lines GL disposed on the display panel 110 may include a first group of gate lines GL(1), GL(3), . . . , GL(n−3), and GL(n−1)) and a second group of gate lines GL(2), GL(4), . . . , GL(n−2), and GL(n).

The first gate driving circuit 121 may operate according to the first gate start pulse GSP1. The first gate driving circuit 121 may drive the first group of gate lines GL. The first group of gate lines GL may be, e.g., odd-numbered gate lines GL(1), GL(3), . . . , GL(n−3), and GL(n−1). During the first active period, the first group of gate lines GL may be driven, performing display driving.

The second gate driving circuit 122 may operate according to the second gate start pulse GSP2. The second gate start pulse GSP2 may be input at a different time from the time when the first gate start pulse GSP1 is input.

The second gate driving circuit 122 may drive the second group of gate lines GL. The second group of gate lines GL may be, e.g., even-numbered gate lines GL(2), GL(4), . . . , GL(n−2), and GL(n). During the second active period, the second group of gate lines GL may be driven, performing display driving.

The first gate driving circuit 121 may concurrently (or simultaneously) drive two or more of the first group of gate lines GL. The second gate driving circuit 122 may concurrently (or simultaneously) drive two or more of the second group of gate lines GL.

Each of the first gate driving circuit 121 and the second gate driving circuit 122 may concurrently (or simultaneously) supply scan signals to two or more gate lines GL and drive the gate lines GL.

At least two or more of the first group of gate lines GL may be electrically connected to each other. At least two or more of the second group of gate lines GL may be electrically connected to each other.

For example, at least two of the gate lines GL included in each group may be electrically connected to each other outside the active area AA. The portions where the gate lines GL are electrically connected to each other may be positioned in the non-active area NA outside the gate driving circuit 120 or may be positioned inside the gate driving circuit 120.

Due to the structure in which the two or more gate lines GL are electrically connected to each other, the two or more gate lines GL may be simultaneously driven.

For example, the first gate driving circuit 121 may simultaneously drive the first gate line GL(1) and the third gate line GL(3) by the scan signal G(1). The second gate driving circuit 122 may simultaneously drive the second gate line GL(2) and the fourth gate line GL(4) by the scan signal G(2).

Since the two gate lines GL are simultaneously driven, two data lines DL for supplying the data voltage Vdata to the subpixels SP disposed in one column may be disposed. For example, as shown in FIG. 8A, the first data line DL(1) and the second data line DL(2) may be disposed to drive the subpixels SP in the first column, Each of the first data line DL(1) and the second data line DL(2) may be connected to the subpixels SP connected to the gate line GL driven by the first gate driving circuit 121 and the subpixels SP connected to the gate line GL driven by the second gate driving circuit 122, supplying the data voltage Vdata.

The two gate lines GL may be concurrently driven by the first gate driving circuit 121 and the second gate driving circuit 122, respectively, and the data voltage Vdata for display driving may be supplied to each subpixel SP.

The number of scan signals supplied to the first group of gate lines GL driven by the first gate driving circuit 121 may be reduced to n/2. The number of scan signals supplied to the second group of gate lines GL driven by the second gate driving circuit 122 may be reduced to n/2.

Since the number of scan signals supplied in each of the first active period and the second active period decreases, the length of the scan signal may be increased. A sufficient period may be secured as necessary to supply the data voltage Vdata to the subpixel SP.

Even if the gate lines GL are driven separately to perform touch sensing according to the second touch mode TM2 during the frame period, and a break period is inserted into the active period, it is possible to secure a sufficient period to supply the data voltage Vdata. It is possible to enhance touch sensing performance without deteriorating display driving performance.

In FIG. 8B, the period Active1 can be considered the first active period, the period Active2 can be considered the second active period. The break period and the blank period can be considered as a third and fourth period, respectively. Each of the first to fourth periods do not need to be the same length as each other and the third and fourth periods can be shorter than the first and second periods; they can also be referred to as partial periods.

Further, the number of gate lines GL simultaneously driven by the gate driving circuit 120 and the layout of additionally disposed data lines DL may vary.

Figure 9:
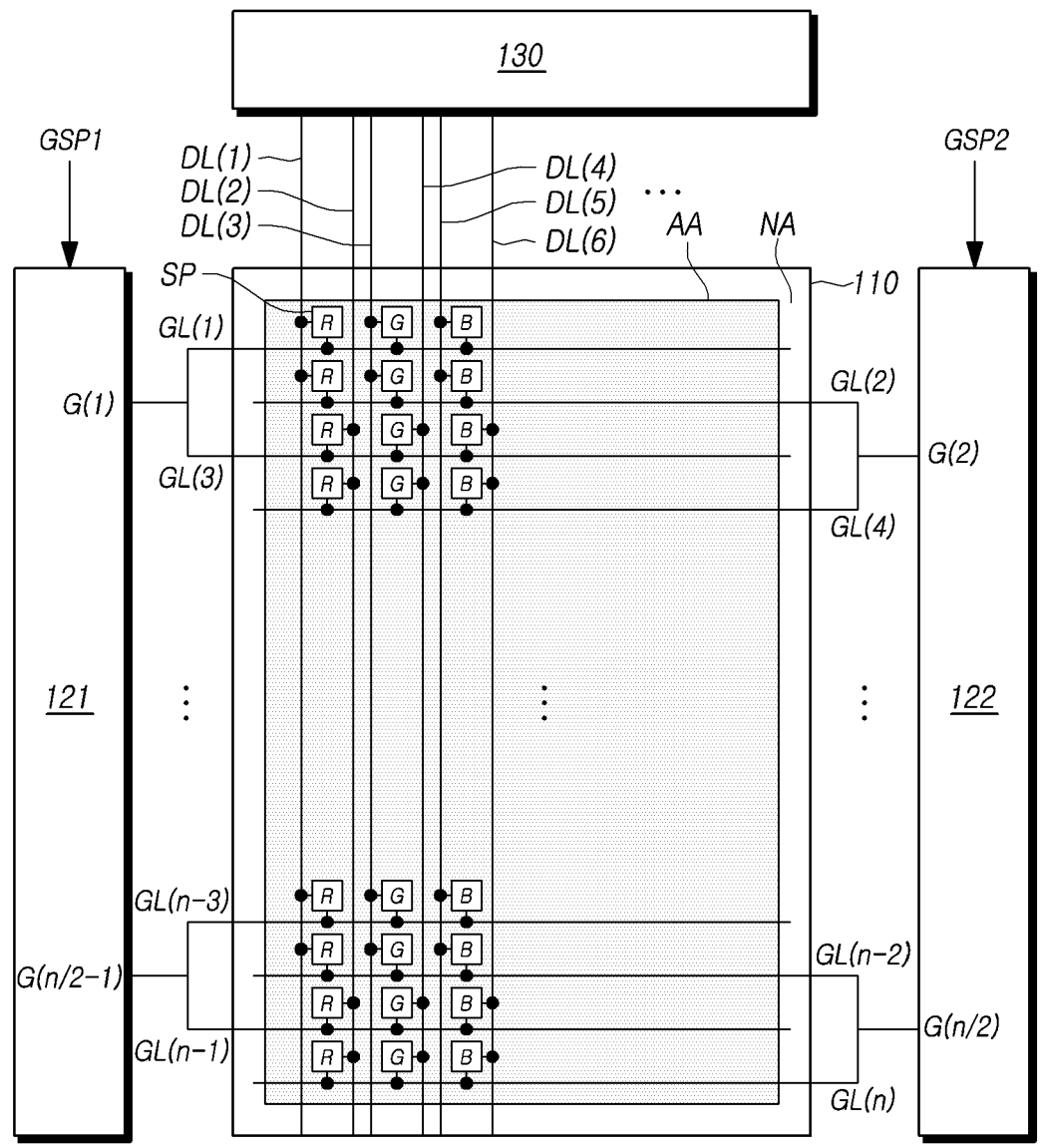
FIGS. 9, 10A, and 10B are views illustrating another example of a structure in which a driving circuit for display driving and signal lines are disposed in a touch display device according to embodiments of the disclosure.
Figure 10A:
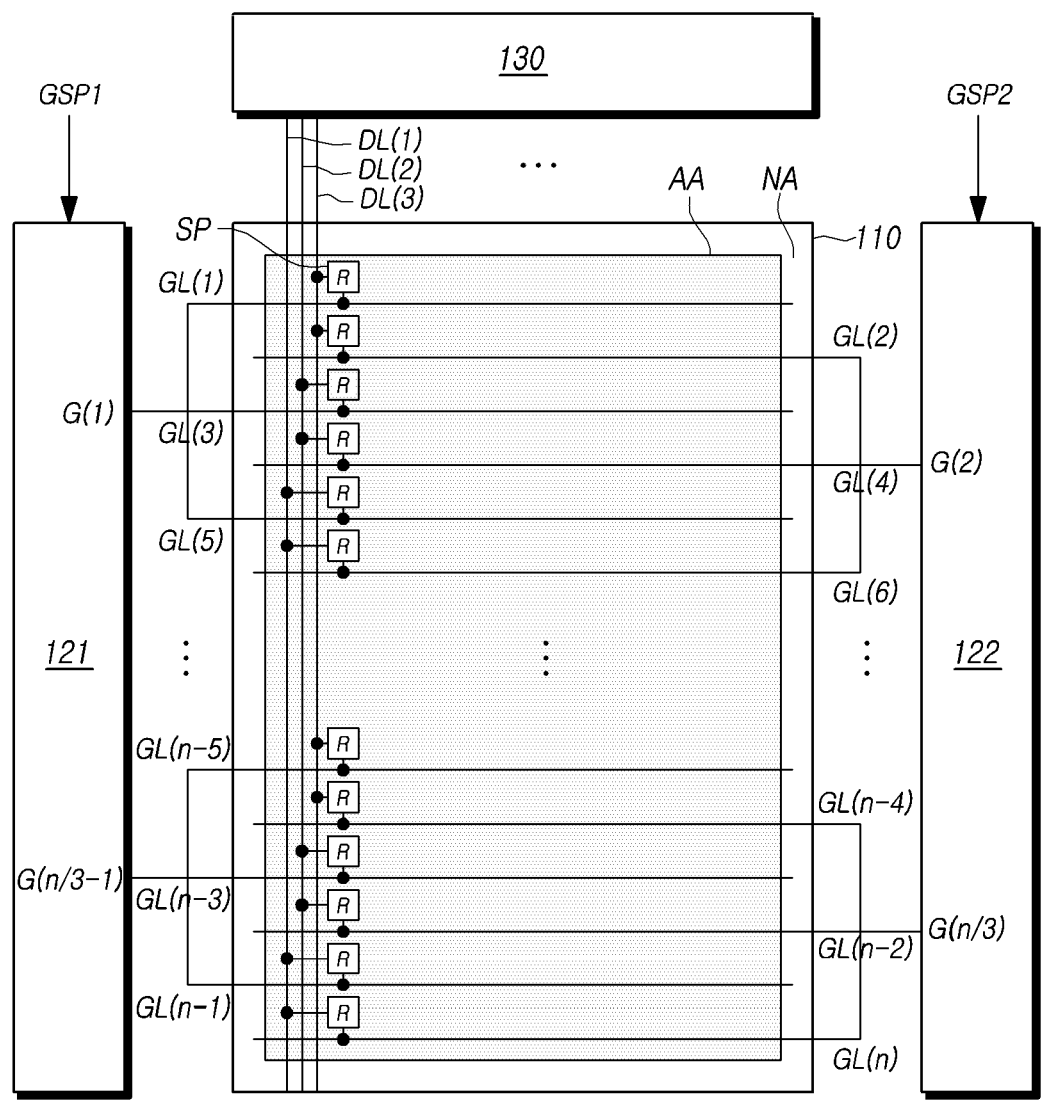
Figure 10B:
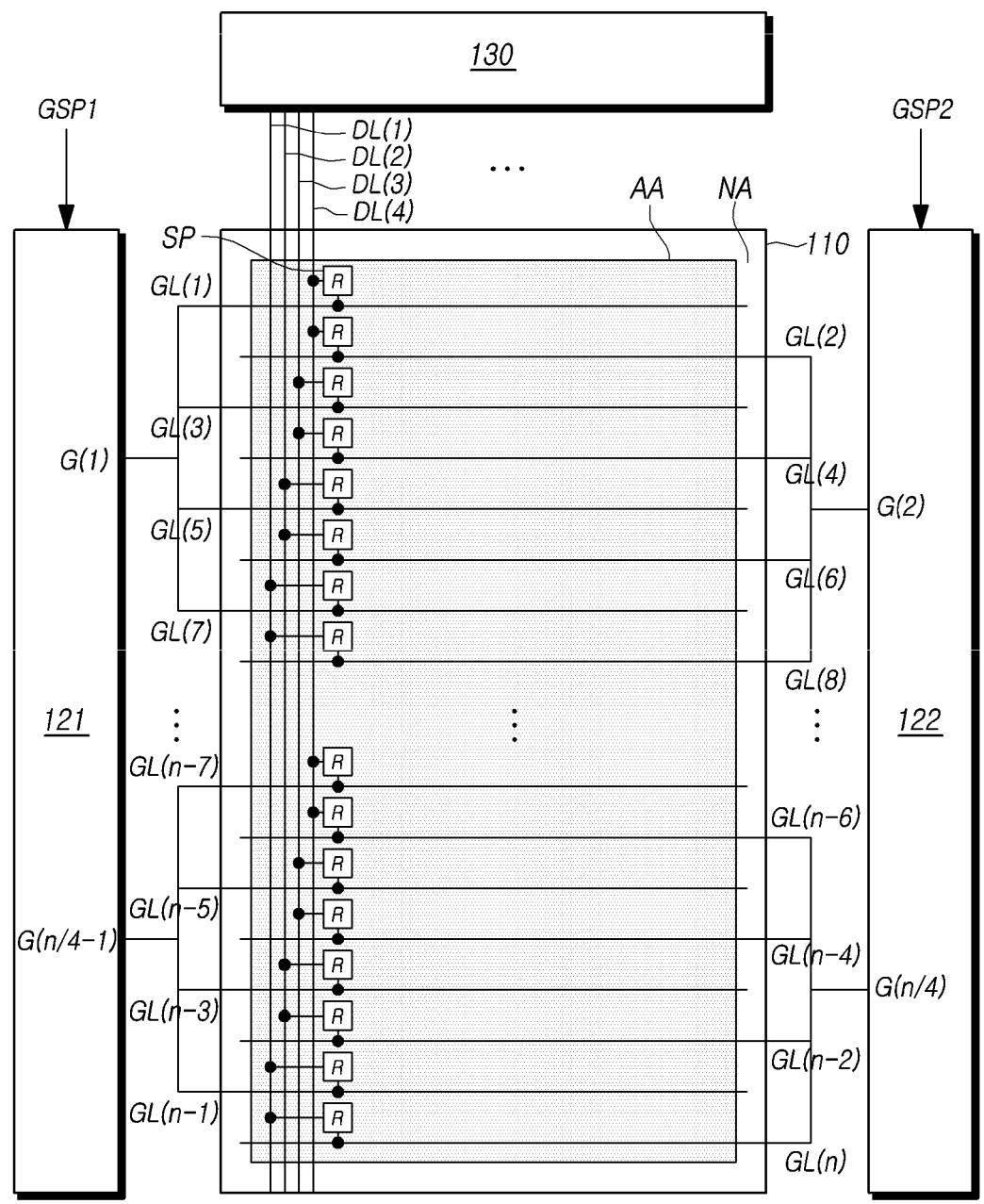

FIGS. 9, 10A, and 10B are views illustrating another example of a structure in which a driving circuit for display driving and signal lines are disposed in a touch display device 100 according to embodiments of the disclosure.

Referring to FIG. 9, the first gate driving circuit 121 may simultaneously drive two gate lines GL among the first group of gate lines GL. The second gate driving circuit 122 may simultaneously drive two gate lines GL among the second group of gate lines GL.

Since the two gate lines GL are simultaneously driven by each of the first gate driving circuit 121 and the second gate driving circuit 122, two data lines DL may be disposed to drive the subpixels SP disposed in each column.

The two data lines DL disposed in each column may be disposed on one side of the column, as in the example illustrated in FIG. 8A.

Alternatively, the two data lines DL disposed in each column may be disposed on two opposite sides of each column, as in the example shown in FIG. 9.

For example, the first data line DL(1) may be disposed on one side of the first column. The second data line DL(2) and the third data line DL(3) may be disposed between the first column and the second column. The fourth data line DL(4) and the fifth data line DL(5) may be disposed between the second column and the third column.

Each data line DL may be electrically connected to the subpixels SP connected to the gate line GL driven by the first gate driving circuit 121 and the subpixels SP connected to the gate line GL driven by the second gate driving circuit 122.

As the two gate lines GL are simultaneously driven, the additionally disposed data lines DL are disposed on two opposite sides of each column, so that the data lines DL may be symmetrically disposed in the active area AA of the display panel 110. According to the simultaneous driving of the two gate lines GL, the data voltage Vdata may be supplied to the subpixels SP, performing display driving.

Even if the break period corresponding to the period when touch sensing is performed according to the second touch mode TM2 is included in the frame period, a sufficient period to supply the data voltage Vdata may be secured, and display driving may be performed.

Further, the period during which the data voltage Vdata is supplied may be increased by increasing the number of gate lines GL that are simultaneously driven, and the period during which touch sensing according to the second touch mode TM2 in a state in which a sufficient time to supply the data voltage Vdata is secured may be increased.

For example, referring to FIG. 10A, the first gate driving circuit 121 may simultaneously drive three gate lines GL among the first group of gate lines GL. For example, the first gate driving circuit 121 may simultaneously drive the first gate line GL(1), the third gate line GL(3), and the fifth gate line GL(5) using the scan signal G(1).

The second gate driving circuit 122 may simultaneously drive three gate lines GL among the second group of gate lines GL. For example, the second gate driving circuit 122 may simultaneously drive the second gate line G(2), the fourth gate line G(4), and the sixth gate line GL(6) using the scan signal G(2).

Since the three gate lines GL are simultaneously driven, three data lines DL may be disposed in each column. Each of the first data line DL(1), the second data line DL(2), and the third data line DL(3) may be electrically connected to the subpixels SP connected to the gate line GL driven by the first gate drive circuit 121 and the subpixels SP connected to the gate line GL driven by the second gate drive circuit 122.

In a structure in which n gate lines GL are disposed on the display panel 110 and driven separately by the first gate driving circuit 121 and the second gate driving circuit 122, the three gate lines GL are simultaneously driven, so that the number of scan signals supplied to drive the gate lines GL in each of the first active period and the second active period may be reduced to n/3.

A sufficient time to supply the data voltage Vdata may be secured. In some cases, it is possible to increase the length of the break time inserted between the first active period and the second active period.

Further, the number of gate lines GL simultaneously driven by each gate driving circuit 120 may be four.

Referring to FIG. 10B, among the gate lines GL driven by each of the first gate driving circuit 121 and the second gate driving circuit 122, four gate lines GL may be simultaneously driven.

The number of scan signals supplied to drive the gate lines GL in each of the first active period and the second active period may be reduced to n/4.

As such, when the break period is inserted between the first active period and the second active period, the number of the gate lines GL driven simultaneously by each of the first gate driving circuit 121 and the second gate driving circuit 122 may be increased so that a break period may be secured without deteriorating the performance of display driving.

Since touch sensing according to the second touch mode TM2 is performed not only in the period corresponding to the blank period included in the frame period but also in the period corresponding to the break period, performance of touch sensing performed according to the second touch mode TM2 may be enhanced.

The foregoing embodiments are briefly described below.

A touch display device according to embodiments of the disclosure may comprise a first gate driving circuit driving a first group of gate lines disposed on a display panel, a second gate driving circuit driving a second group of gate lines distinct from the first group, and a touch driving circuit driving a plurality of touch electrodes disposed on the display panel according to a first touch mode in a first period when the first group of gate lines are driven and a second period when the second group of gate lines are driven and driving the plurality of touch electrodes according to a second touch mode in at least a partial period between the first period and the second period. Namely, there can be a third period between the first period and the second period. There may also be a fourth period after or before the first and second period. The third and fourth periods can be partial periods and do not need to be of same length of time as the first and second periods. During either the third and fourth periods, or both, touch electrodes can be driven according to the second touch mode.

A first interval may be present between when a last gate line of the first group of gate lines is driven and when a first gate line of the second group of gate lines is driven.

A second interval may be present between when a last gate line of the second group of gate lines is driven and when a first gate line of the first group of gate lines is driven.

The first interval may be the same as the second interval.

All of the plurality of touch electrodes may be driven according to the second touch mode during at least a partial period of the first interval. All of the plurality of touch electrodes may be driven according to the second touch mode during at least a partial period of the second interval.

At least two of the first group of gate lines may be simultaneously driven in the first period. At least two of the second group of gate lines may be simultaneously driven in the second period.

At least two of the first group of gate lines may be electrically connected with each other. At least two of the second group of gate lines may be electrically connected with each other.

Each of the first group of gate lines may be alternately disposed with each of the second group of gate lines.

The first gate driving circuit may receive a first gate start pulse to operate. The second gate driving circuit may receive a second gate start pulse, input at a different time from a time when the first gate start pulse is input, to operate.

In the first touch mode, among the plurality of touch electrodes, a first touch electrode may operate as a touch driving electrode, and a second touch electrode may operate as a touch sensing electrode. In the second touch mode, the first touch electrode and the second touch electrode may operate as the touch driving electrode in a partial period and operate as the touch sensing electrode in a remaining period.

In the first touch mode, a first touch driving signal may be supplied to the first touch electrode and, in the second touch mode, a second touch driving signal may be supplied to the first touch electrode and the second touch electrode. An amplitude of the second touch driving signal may be larger than an amplitude of the first touch driving signal.

A period when the first touch electrode operates as the touch driving electrode in the second touch mode may be distinct from a period when the second touch electrode operates as the touch driving electrode.

A touch display device according to embodiments of the disclosure may comprise a plurality of touch electrodes disposed on a display panel, a touch driving circuit driving some of the plurality of touch electrodes according to a first touch mode in a first period, driving others of the plurality of touch electrodes according to the first touch mode in a second period, and driving all of the plurality of touch electrodes according to a second touch mode during a third period between the first period and the second period. There may also be a fourth period after or before the first and second period. The third and fourth periods can be partial periods and do not need to be of same length of time as the first and second periods. A gate driving circuit driving some of a plurality of gate lines disposed on the display panel in the first period, driving others of the plurality of gate lines in the second period, and refraining from driving the plurality of gate lines between the first period and the second period.

An interval between the first period and the second period may be the same as a length of a blank period included in a frame period.

At least two of the plurality of gate lines may be simultaneously driven in each of the first period and the second period.

A touch display device according to embodiments of the disclosure may comprise a plurality of touch electrodes disposed on a display panel and a touch driving circuit driving the plurality of touch electrodes, wherein the touch driving circuit drives the plurality of touch electrodes according to a first touch mode in a first period and a second period of an active period of a frame period and drives the plurality of touch electrodes according to a second touch mode in a blank period of the frame period and a period between the first period and the second period.

Some of the plurality of touch electrodes may be driven in each of the first period and the second period, and all of the plurality of touch electrodes may be driven in each of the blank period and the period between the first period and the second period.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a first gate driving circuit configured to drive a first group of gate lines disposed on a display panel;
a second gate driving circuit configured to drive a second group of gate lines distinct from the first group; and
a touch driving circuit,
wherein display driving of the touch display device is performed based on frame periods, and one frame period comprises a first active period, a second active period, a break period between the first and second active periods, and a blank period following the second active period,
wherein the touch driving circuit configured to:
drive a plurality of touch electrodes disposed on the display panel according to a first touch mode in a first period corresponding to the first active period when the first group of gate lines are driven and in a second period corresponding to the second active period when the second group of gate lines are driven; and
drive the plurality of touch electrodes according to a second touch mode during the break period between the first period and the second period,
wherein the break period between the first and second active periods included in the one frame period includes a first sub sensing period and a second sub sensing period following the first sub sensing period, and a touch driving signal provided during the first sub sensing period is different from a touch driving signal provided during the second sub sensing period, and
wherein the touch driving signal provided during the first sub sensing period includes a plurality of pulses each having a first voltage level and a second voltage level greater than the first voltage level, and the touch driving signal provided during the second sub sensing period has a constant voltage greater than the first voltage level.

2. The touch display device of claim 1, wherein at least two of the first group of gate lines are concurrently driven in the first period, and at least two of the second group of gate lines are concurrently driven in the second period.

3. The touch display device of claim 1, wherein at least two of the first group of gate lines are electrically connected with each other, and at least two of the second group of gate lines are electrically connected with each other, and wherein each of the first group of gate lines is alternately disposed with each of the second group of gate lines.

4. The touch display device of claim 1, wherein the first gate driving circuit is configured to receive a first gate start pulse to operate, and the second gate driving circuit is configured to receive a second gate start pulse to operate, and
wherein the second gate start pulse is input at a different time from a time when the first gate start pulse is input.

5. The touch display device of claim 1, wherein a first interval is present between when a last gate line of the first group of gate lines is driven and when a first gate line of the second group of gate lines is driven, and
wherein a second interval is present between when a last gate line of the second group of gate lines is driven and when a first gate line of the first group of gate lines is driven.

6. The touch display device of claim 5, wherein a duration of the first interval is the same as a duration of the second interval.

7. The touch display device of claim 5, wherein all of the plurality of touch electrodes are driven according to the second touch mode during at least a partial period of the first interval, and all of the plurality of touch electrodes are driven according to the second touch mode during at least a partial period of the second interval.

8. The touch display device of claim 1, wherein in the first touch mode, among the plurality of touch electrodes, a first touch electrode operates as a touch driving electrode, and a second touch electrode operates as a touch sensing electrode, and
wherein in the second touch mode, the first touch electrode and the second touch electrode operate as the touch driving electrode in a partial period and operate as the touch sensing electrode in a remaining period.

9. The touch display device of claim 8, wherein in the first touch mode, a first touch driving signal is supplied to the first touch electrode and, in the second touch mode, a second touch driving signal is supplied to the first touch electrode and the second touch electrode, and wherein an amplitude of the second touch driving signal is larger than an amplitude of the first touch driving signal.

10. The touch display device of claim 8, wherein a period when the first touch electrode operates as the touch driving electrode in the second touch mode is distinct from a period when the second touch electrode operates as the touch driving electrode.

11. A touch display device, comprising:
a plurality of touch electrodes disposed on a display panel;
a touch driving circuit configured to:
drive a first group of the plurality of touch electrodes according to a first touch mode in a first period,
drive a second group of the plurality of touch electrodes according to the first touch mode in a second period, and
drive all of the plurality of touch electrodes including the first and second groups according to a second touch mode during a time period between the first period and the second period; and
a gate driving circuit,
wherein display driving of the touch display device is performed based on frame periods, and one frame period comprises a first active period, a second active period, a break period between the first and second active periods, and a blank period following the second active period,
wherein the gate driving circuit configured to:
drive a first group of a plurality of gate lines disposed on the display panel in the first period corresponds to the first active period prior to the break period,
drive a second group of the plurality of gate lines in the second period corresponds to the second active period following the break period, and not drive the plurality of gate lines including the first and second groups between the first period and the second period corresponds to the break period, wherein the break period between the first and second active periods included in the one frame period includes a first sub sensing period and a second sub sensing period following the first sub sensing period, and a touch driving signal provided during the first sub sensing period is different from a touch driving signal provided during the second sub sensing period, and wherein the touch driving signal provided during the first sub sensing period includes a plurality of pulses each having a first voltage level and a second voltage level greater than the first voltage level, and the touch driving signal provided during the second sub sensing period has a constant voltage greater than the first voltage level.

12. The touch display device of claim 11, wherein an interval between the first period and the second period is the same as a length of the blank period.

13. The touch display device of claim 11, wherein at least two of the plurality of gate lines are concurrently driven in each of the first period and the second period.

14. The touch display device of claim 11, wherein the first group of the plurality of gate lines includes a shared gate line that is electrically connected to at least two gate lines arranged in a different row of the display panel, and wherein the second group of the plurality of gate lines includes a shared gate line that is electrically connected to at least two gate lines arranged in a different row of the display panel.

15. A touch display device, comprising:
a display panel having gate lines and data lines;
a plurality of touch electrodes disposed on the display panel;
a touch driving circuit configured to drive the plurality of touch electrodes, wherein the touch driving circuit is configured to drive the plurality of touch electrodes according to two different touch modes during a single frame period; and
a gate driving circuit,
wherein the frame period includes one or more active periods during which at least one gate line is driven and one or more blank periods during which a gate line is not driven, and the single frame period includes a first active period, a second active period, a first blank period between the first and second active periods, and a second blank period following the second active period,
wherein the two touch modes include:
a first touch mode for sensing a touch of a user; and
a second touch mode for sensing an input from the user using a touch input device,
wherein a first touch sensing period during which the second touch mode operates overlaps with any one of the first and second blank periods,
wherein at least one of the first blank period between the first and second active periods included in the single frame period and second blank period following the second active period includes a first sub sensing period and a second sub sensing period following the first sub sensing period, and a touch driving signal provided during the first sub sensing period is different from a touch driving signal provided during the second sub sensing period, and
wherein the touch driving signal provided during the first sub sensing period includes a plurality of pulses each having a first voltage level and a second voltage level greater than the first voltage level, and the touch driving signal provided during the second sub sensing period has a constant voltage greater than the first voltage level.

16. The touch display device of claim 15, wherein a second touch sensing period during which the first touch mode operates overlaps with the first active period, and wherein a third touch sensing period during which the second touch mode operates overlaps with the second active period.

17. The touch display device of claim 16, wherein a touch driving signal provided during the second touch sensing period has a first amplitude and a first touch driving frequency,
wherein a touch driving signal provided during the third touch sensing period has a second amplitude and a second touch driving frequency,
wherein the second amplitude is greater than the first amplitude.

18. The touch display device of claim 17, wherein the first touch driving frequency and the second touch driving frequency are different from each other.

19. The touch display device of claim 15,
wherein the first active period, the first blank period, the second active period, and the second blank period are sequentially arranged in said order and are continuous and contiguous to each other.

20. The touch display device of claim 19, wherein a second touch sensing period during which the first touch mode operates overlaps with the first active period,
wherein a third touch sensing period during which the second touch mode operates overlaps with the second blank period, and
wherein a fourth touch sensing period during which the first touch mode operates overlaps with the second active period.

* * * * *